(12) United States Patent
Grunwald et al.

(10) Patent No.: US 10,859,782 B2
(45) Date of Patent: Dec. 8, 2020

(54) FIBER ENCLOSURE

(71) Applicant: Ortronics, Inc., New London, CT (US)

(72) Inventors: Brad Neil Grunwald, Garland, TX (US); Maro Radenovic, Dallas, TX (US); Jeffrey William Tebeau, Dallas, TX (US); Antoniette Vickio, Farmers Branch, TX (US); Michael James Moldoch, Colchester, CT (US); Randy L. Harris, Lenoir, NC (US); Ryan J. Grandidge, Wakefield, RI (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 16/223,756

(22) Filed: Dec. 18, 2018

(65) Prior Publication Data
US 2019/0196128 A1   Jun. 27, 2019

Related U.S. Application Data

(60) Provisional application No. 62/609,176, filed on Dec. 21, 2017.

(51) Int. Cl.
*G02B 6/44* (2006.01)
*H04Q 1/02* (2006.01)

(52) U.S. Cl.
CPC ......... *G02B 6/4452* (2013.01); *G02B 6/4471* (2013.01); *H04Q 1/131* (2013.01); *G02B 6/4453* (2013.01)

(58) Field of Classification Search
CPC .. G02B 6/4452; G02B 6/4471; G02B 6/4453; H04Q 1/131
See application file for complete search history.

(56) References Cited

U.S. PATENT DOCUMENTS

| 5,497,444 A * | 3/1996 | Wheeler | G02B 6/4452 385/134 |
| 7,570,861 B2 * | 8/2009 | Smrha | G02B 6/4452 385/135 |
| 7,697,811 B2 | 4/2010 | Murano et al. | |
| 7,983,038 B2 | 7/2011 | Levesque et al. | |
| 8,106,311 B2 | 1/2012 | Larsen et al. | |
| 8,184,938 B2 | 5/2012 | Cooke et al. | |
| 8,398,039 B2 | 3/2013 | Murano et al. | |

(Continued)

OTHER PUBLICATIONS

U.S. Appl. No. 62/609,176, filed Dec. 21, 2017.

*Primary Examiner* — Ryan A Lepisto
(74) *Attorney, Agent, or Firm* — McCarter & English, LLP

(57) ABSTRACT

The present disclosure provides improved media patching systems, and related methods of use. The present disclosure provides improved systems/methods for the design and use of patching systems configured to support multiple media connections (e.g., high density media connections). More particularly, the present disclosure provides advantageous systems/methods for the design and use of media patching systems that include improved features and structures (e.g., camming door; stackable cable manager members; tool-less mounting attachments; cable/fiber retention grommets; pivotable cable management arms; removable panel members; sliding label fields). Moreover, exemplary media patching systems disclosed herein advantageously provide improved access to the media connectors and/or cabling elements.

25 Claims, 34 Drawing Sheets

(56) References Cited

U.S. PATENT DOCUMENTS

| | | |
|---|---|---|
| 8,439,702 B2 | 5/2013 | Dietz et al. |
| 8,672,709 B2 | 3/2014 | Dietz et al. |
| 8,731,364 B2 | 5/2014 | Murano et al. |
| 8,758,047 B2 | 6/2014 | Dietz et al. |
| 9,606,317 B2 | 3/2017 | Grandidge et al. |
| 9,784,936 B2 | 10/2017 | Grandidge et al. |
| 9,997,899 B2 | 6/2018 | Grandidge et al. |
| 2015/0364876 A1 | 12/2015 | Grandidge et al. |
| 2016/0077298 A1* | 3/2016 | Wiltjer ............... G02B 6/4453 211/126.15 |

* cited by examiner

FIBER ENCLOSURE

CROSS-REFERENCE TO RELATED APPLICATIONS

This application claims the benefit of U.S. Provisional Application entitled "FIBER ENCLOSURE," which was filed on Dec. 21, 2017, and assigned Ser. No. 62/609,176, the contents of which are herein incorporated by reference in their entirety.

FIELD OF THE DISCLOSURE

The present disclosure relates to patching systems configured to support media connections (e.g., high density media connections) and, more particularly, to media patching systems that include improved features and structures (e.g., camming door; stackable cable manager members; tool-less mounting attachments; cable/fiber retention grommets; pivotable cable management arms; removable panel members; sliding label fields).

BACKGROUND OF THE DISCLOSURE

In general, devices for interfacing with high frequency data transfer media are known. See, e.g., U.S. Pat. Nos. 8,439,702; 8,672,709; 8,731,364; 9,606,317 and 9,784,936; and U.S. Patent Pub. Nos. 2015/0362092 and 2015/0364876, the entire contents of each being hereby incorporated by reference in their entireties.

For example, connectors or jack assemblies having a plurality of contacts (e.g., modular communication jacks) have been developed that facilitate communication with contacts in connecting assemblies (e.g., plug connectors), that in turn interact with various media (e.g., copper-based media such as unshielded twisted pair (UTP) media, fiber optic cables, etc.). The jack assembly contacts are typically positioned for communication with data signal transmission media plug elements/contacts introduced to a receiving space of the jack assembly.

In general, many data transfer media includes multiple pairs of lines bundled together. Communications systems typically incorporate such media (e.g., UTP media, fiber optic cables, etc.) and connectors (e.g., jack/plug combinations) for data transfer. For example, a plurality of jack assemblies/housings may be positioned adjacent one another in a multi-gang jack panel or the like, with each jack assembly/housing releasably secured and/or attached to the jack panel or the like.

In general, commercial buildings require an effective and efficient telecommunications infrastructure to support the wide variety of services that rely on the transport of information. Typically, wiring systems within buildings are terminated at a location where they may be interconnected with one another, and/or to other cabling systems or telecommunications equipment. Cables are often terminated on wire panels or patch panels or the like, which can be mounted to racks or to some other location/structure.

Patch panels are known in the field of data communication systems. See, e.g., U.S. Pat. No. 8,106,311, the entire contents of which is hereby incorporated by reference in its entirety.

Some other exemplary assemblies/systems in this general field are described and disclosed in U.S. Pat. Nos. 7,697,811; 7,983,038; 8,184,938; 8,398,039; and U.S. Patent Pub. Nos. 2012/0064760 and 2013/0129296, the entire contents of each being hereby incorporated by reference in their entireties.

A patch panel generally provides a plurality of network ports incorporated into a structural element that connect incoming and outgoing lines of a communication/electrical system (e.g., a local area network (LAN) or the like). Typical patch panels are mounted hardware units that include a plurality of port locations, and utilize cables for interconnections. A patch panel can use patch cords to create the interconnections. Patch panel systems are generally intended to facilitate organization and management in implementing telecommunications wiring systems (e.g., for high speed data networks).

In general, many rows of cabinets or racks typically fill a data center or telecommunications room. Patch panels affixed to a rack and/or a telecommunications room provide convenient access to telecommunication devices (e.g., servers) within the rack or room. As the demand for the use of telecommunication devices rapidly grows, space for such devices becomes limited and/or expensive.

A constant need exists among manufacturers to develop patch panel assemblies/patching systems or the like that include improved features and structures.

Thus, an interest exists for improved patch panel assemblies/patching systems and related methods of use. These and other inefficiencies and opportunities for improvement are addressed and/or overcome by the assemblies, systems and methods of the present disclosure.

SUMMARY OF THE DISCLOSURE

The present disclosure provides advantageous media patching systems, and improved methods for using the same. The present disclosure provides advantageous patching systems configured to support multiple media connections (e.g., high density media connections), and related methods of use.

More particularly, the present disclosure provides improved systems/methods for the design and use of media patching systems that include improved features and structures (e.g., camming door; stackable cable manager members; tool-less mounting attachments; cable/fiber retention grommets; pivotable cable management arms; removable panel members; sliding label fields).

Moreover, exemplary media patching systems disclosed herein advantageously provide improved access to the media connectors and/or cabling elements.

The present disclosure provides for a media patching system including a tray member movably mounted relative to a base member, the tray member hingedly mounted to a front door member; a left side wall, a right side wall and a rear door member mounted to the base member, with a top cover member mounted to the left and right side walls; a first panel assembly mounted to the tray member, the first panel assembly having a plurality of apertures with each aperture configured to mount to a media connector assembly; a first C-shaped cable manager member mounted to the tray member proximal to the left side wall; and a second C-shaped cable manager member mounted to the tray member proximal to the right side wall.

The present disclosure also provides for a media patching system wherein the tray member can move relative to the base member. The present disclosure also provides for a media patching system wherein the media connector assembly includes one or more ports or adapters to facilitate communication with a mating fiber optic connector. The present disclosure also provides for a media patching system wherein the media connector assembly is a fiber optic cassette having a plurality of fiber optic ports for mating with fiber optic connectors.

The present disclosure also provides for a media patching system wherein when the front door member opens, a cam surface of the base member cams against the front door member, thereby moving the tray member forward. The present disclosure also provides for a media patching system wherein the base member includes one or more tab members that provide the camming surface and camming action against the front door member to move the tray member forward.

The present disclosure also provides for a media patching system further including a third C-shaped cable manager member mounted to the top of the first C-shaped cable manager member; and a fourth C-shaped cable manager member mounted to the top of the second C-shaped cable manager member. The present disclosure also provides for a media patching system wherein the third C-shaped cable manager member is mounted to the top of the first C-shaped cable manager member via a first spacer member; and wherein the fourth C-shaped cable manager member is mounted to the top of the second C-shaped cable manager member via a second spacer member.

The present disclosure also provides for a media patching system wherein the first C-shaped cable manager member is mounted to the tray member proximal to the left side wall via a first protrusion member; and wherein the second C-shaped cable manager member is mounted to the tray member proximal to the right side wall via a second protrusion member.

The present disclosure also provides for a media patching system wherein the first and second C-shaped cable manager members are each configured to house or secure cables or fibers for cable or fiber management purposes.

The present disclosure also provides for a media patching system including a tray member movably mounted relative to a base member, the tray member hingedly mounted to a front door member; a left side wall, a right side wall and a rear door member mounted to the base member, with a top cover member mounted to the left and right side walls; a panel assembly mounted to the tray member, the panel assembly having a plurality of apertures with each aperture configured to mount to a media connector assembly; and a first mounting bracket assembly mounted to the left side wall, and a second mounting bracket assembly mounted to the right side wall; wherein the first and second mounting bracket assemblies are configured to mount to a supporting structure; wherein the first and second mounting bracket assemblies are movable between a first position and a second position relative to the respective left and right side walls and while the first and second mounting bracket assemblies are mounted to the respective left and right side walls.

The present disclosure also provides for a media patching system wherein the first mounting bracket assembly is movable between the first position and the second position relative to the left side wall via a first plunger member engaging with the left side wall; and wherein the second mounting bracket assembly is movable between the first position and the second position relative to the right side wall via a second plunger member engaging with the right side wall.

The present disclosure also provides for a media patching system wherein the first mounting bracket assembly is movable between the first position and the second position relative to the left side wall via a first pin member moving within a first slot of the left side wall; and wherein the second mounting bracket assembly is movable between the first position and the second position relative to the right side wall via a second pin member moving within a second slot of the right side wall.

The present disclosure also provides for a media patching system wherein the first and second mounting bracket assemblies each include a bracket ear member, each bracket ear member configured to be mounted to the supporting structure, and wherein the supporting structure is a rack; and wherein the first and second mounting bracket assemblies are movable between the first position and the second position while each bracket ear member is mounted to the rack.

The present disclosure also provides for a media patching system wherein a user can move the first and second mounting bracket assemblies from the first position to the second position, and vice versa, without the use of tools.

The present disclosure also provides for a media patching system including a tray member movably mounted relative to a base member, the tray member hingedly mounted to a front door member; a left side wall, a right side wall and a rear door member mounted to the base member, with a top cover member mounted to the left and right side walls; a panel assembly mounted to the tray member, the panel assembly having a plurality of apertures with each aperture configured to mount to a media connector assembly; and a first rear cable management assembly mounted to the left side wall, and a second rear cable management assembly mounted to the right side wall; wherein the first and second rear cable management assemblies are each configured to house or secure cables or fibers for cable or fiber management purposes; wherein the first and second rear cable management assemblies are movable between a first position and a second position relative to the respective left and right side walls.

The present disclosure also provides for a media patching system wherein the first rear cable management assembly is movable between the first position and the second position relative to the left side wall via a first plunger member and a first pin member disengaging and engaging with the left side wall; and wherein the second rear cable management assembly is movable between the first position and the second position relative to the right side wall via a second plunger member and a second pin member disengaging and engaging with the right side wall. The present disclosure also provides for a media patching system wherein the first and second pin members disengage and engage with the respective left and right side walls via keyhole slots positioned on the left and right side walls.

The present disclosure also provides for a media patching system wherein a user can move the first and second rear cable management assemblies from the first position to the second position, and vice versa, without the use of tools. The present disclosure also provides for a media patching system wherein the first and second rear cable management assemblies each include an extending portion that extends to a retainer section, with a grommet member housed within each retainer section, each grommet member including one or more cable lumens configured to house or secure cables for cable management purposes.

The present disclosure also provides for a media patching system including a tray member movably mounted relative to a base member, the tray member hingedly mounted to a front door member; a left side wall, a right side wall and a rear door member mounted to the base member, with a top cover member mounted to the left and right side walls; a panel assembly mounted to the tray member, the panel assembly having a plurality of apertures with each aperture configured to mount to a media connector assembly; and a pivotable cable management arm mounted to the base member, the pivotable cable management arm positioned proximal the right side wall and proximal the rear door member; wherein the pivotable cable management arm is configured to pivot via pivot member relative to the base member.

The present disclosure also provides for a media patching system wherein the pivotable cable management arm includes a first bridge lance member that is configured to abut against a second bridge lance member of the base member to stop the pivotable cable management arm from rotating too far towards the front door member.

The present disclosure also provides for a media patching system further including a mounting disc releasably mounted to the pivotable cable management arm. The present disclosure also provides for a media patching system wherein the mounting disc is configured and dimensioned to allow one or more spool assemblies to be mounted thereon for cable management purposes. The present disclosure also provides for a media patching system wherein the mounting disc is configured to removably mount with respect to an aperture of the pivotable cable management arm; and wherein after being mounted relative to the aperture, the mounting disc can freely rotate 360° around and relative to the aperture. The present disclosure also provides for a media patching system wherein the mounting disc includes one or more slots that are configured and dimensioned to allow spool assemblies to be mounted with respect to the mounting disc. The present disclosure also provides for a media patching system wherein the mounting disc includes one or more apertures, each aperture configured to releasably secure a breakout assembly.

The present disclosure also provides for a media patching system wherein the tray member includes one or more fastener members that are configured to mount the first panel assembly to the tray member; wherein removal of the one or more fastener members allow a user to quickly and easily remove and replace the first panel assembly for a second panel assembly mounted to tray member via the one or more fastener members, the second panel assembly having a plurality of apertures with each aperture configured to mount to a media connector assembly.

The present disclosure also provides for a media patching system wherein a first moveable label field member can be positioned on top of the tray member, and the first moveable label field member can also be removed and replaced from the tray member with a second moveable label field member.

The present disclosure also provides for a media patching system wherein the interior of the left and right side walls each include one or more LED lighting members, each LED lighting member mounted to a battery; and wherein each LED lighting member includes a strip or length of LED lights.

Any combination or permutation of embodiments is envisioned. Additional advantageous features, functions and applications of the disclosed systems, methods and assemblies of the present disclosure will be apparent from the description which follows, particularly when read in conjunction with the appended figures.

All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

Figure 1:
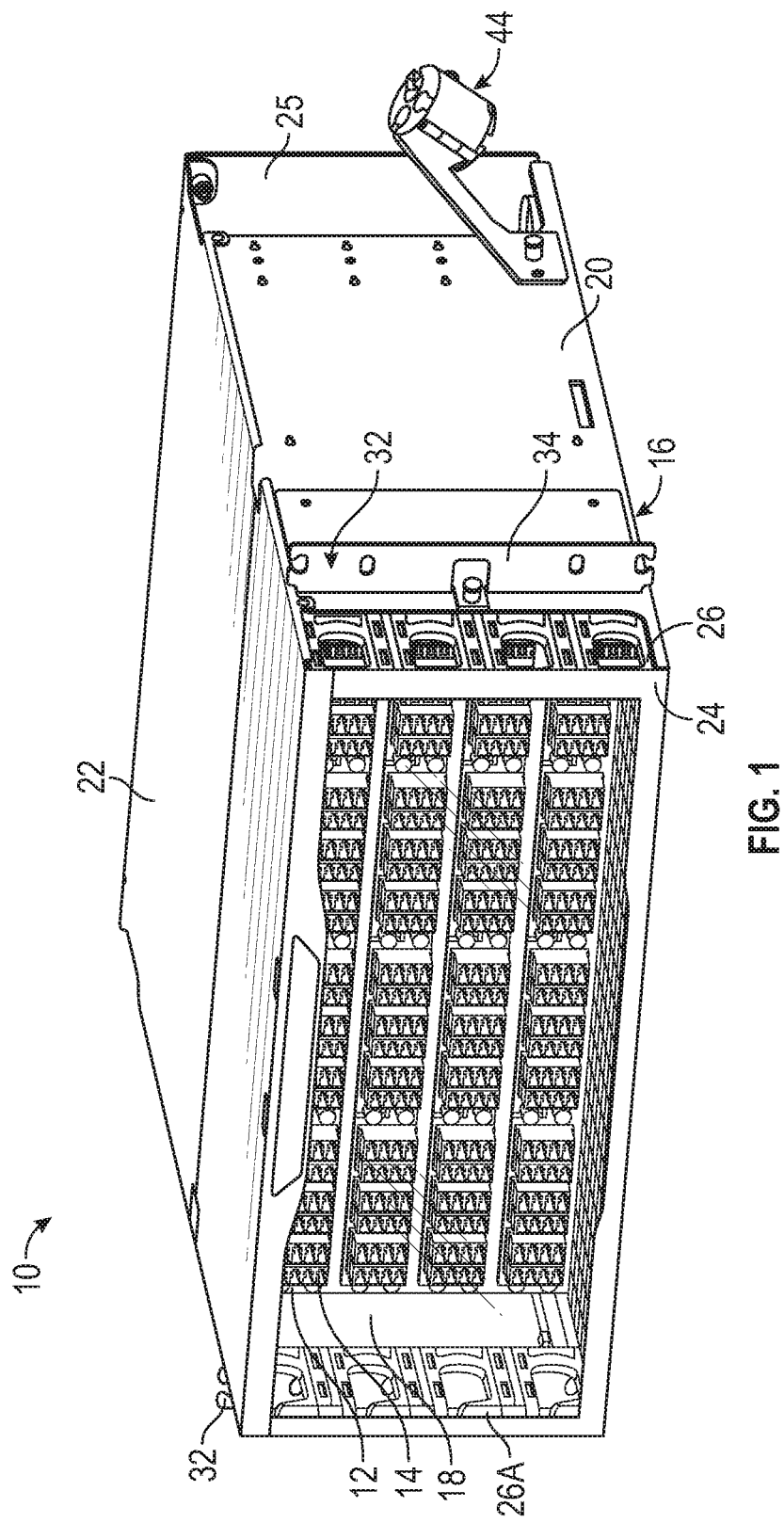
FIG. 1 is a side perspective view of a media patching system according to an exemplary embodiment of the present disclosure.
Figure 2:
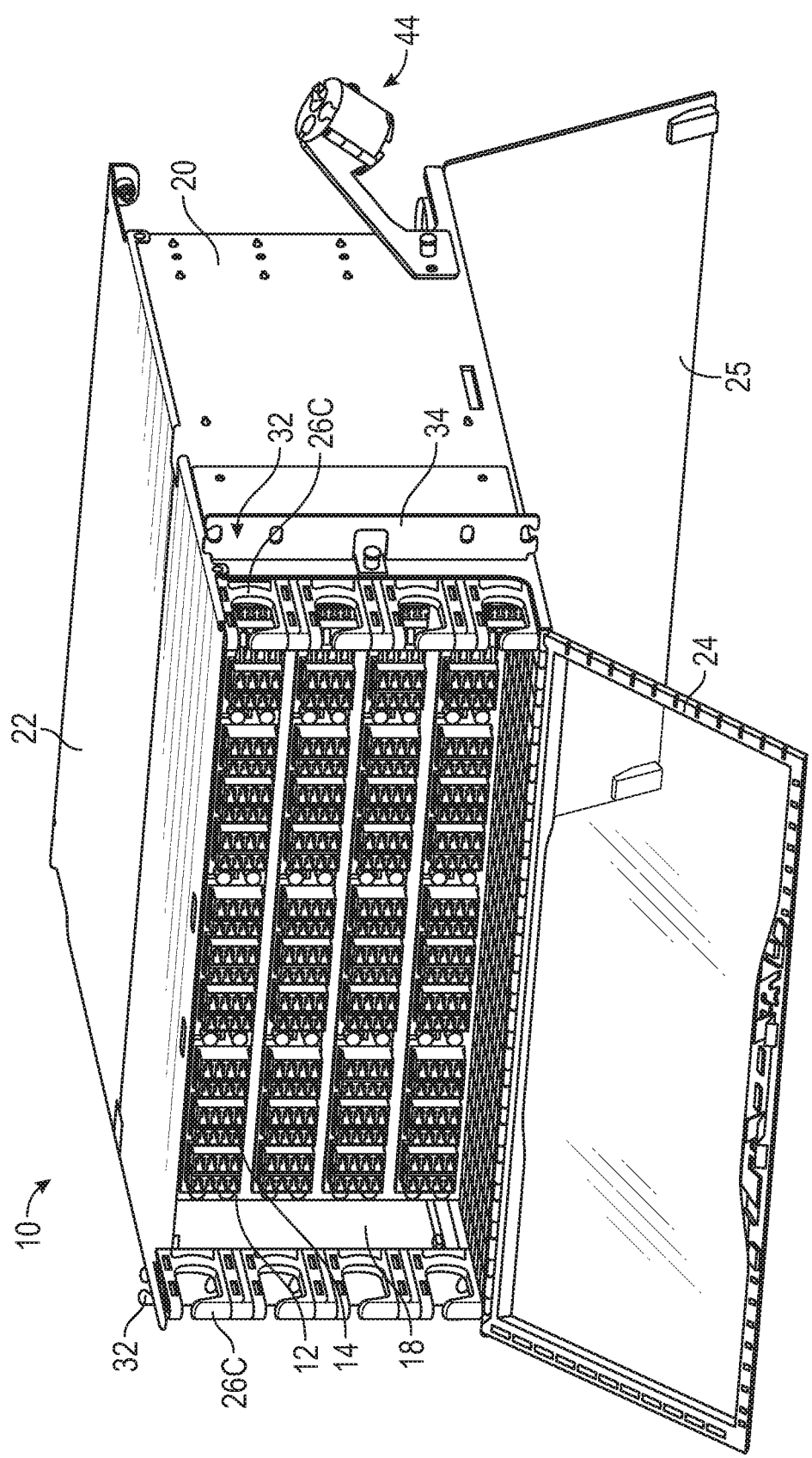
FIG. 2 is another side perspective view of the system of FIG. 1.

The exemplary embodiments disclosed herein are illustrative of advantageous media patching systems of the present disclosure and methods/techniques thereof. It should be understood, however, that the disclosed embodiments are merely exemplary of the present disclosure, which may be embodied in various forms. Therefore, details disclosed herein with reference to exemplary patching systems/fabrication methods and associated processes/techniques of assembly and use are not to be interpreted as limiting, but merely as the basis for teaching one skilled in the art how to make and use the advantageous patching systems and/or alternative assemblies of the present disclosure.

In general, the present disclosure provides improved media patching systems, and related methods of use. The present disclosure provides improved systems/methods for the design and use of patching systems configured to support multiple media connections (e.g., high density media connections). More particularly, the present disclosure provides advantageous systems/methods for the design and use of media patching systems that include improved features and structures (e.g., camming door; stackable cable manager members; tool-less mounting attachments; cable retention grommets; pivotable cable management arms; removable panel members; sliding label fields).

Moreover, exemplary media patching systems disclosed herein advantageously provide improved access to the media connectors and/or cabling elements.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 1-2 and 5-6, there is illustrated an embodiment of an exemplary media patching system 10 according to the present disclosure. In general, media patching system 10 is configured and dimensioned to be used as a patching system for media connections. More particularly, media patching system 10 can be configured to support high density media connections. It is noted that media patching system 10 can take a variety of forms, shapes and/or designs.

Figure 5:
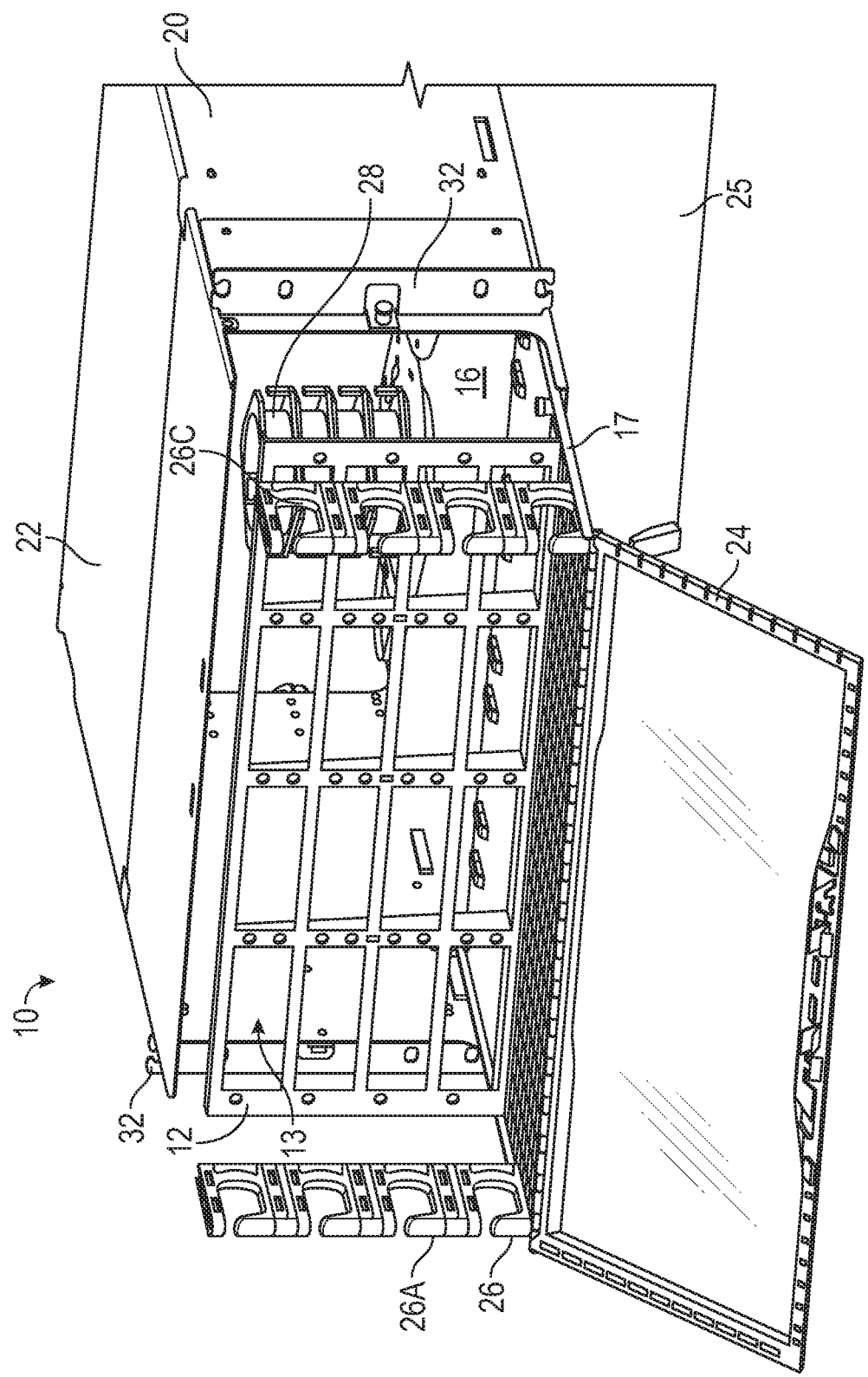
FIG. 5 is another side perspective view of the system of FIG. 1.
Figure 6:
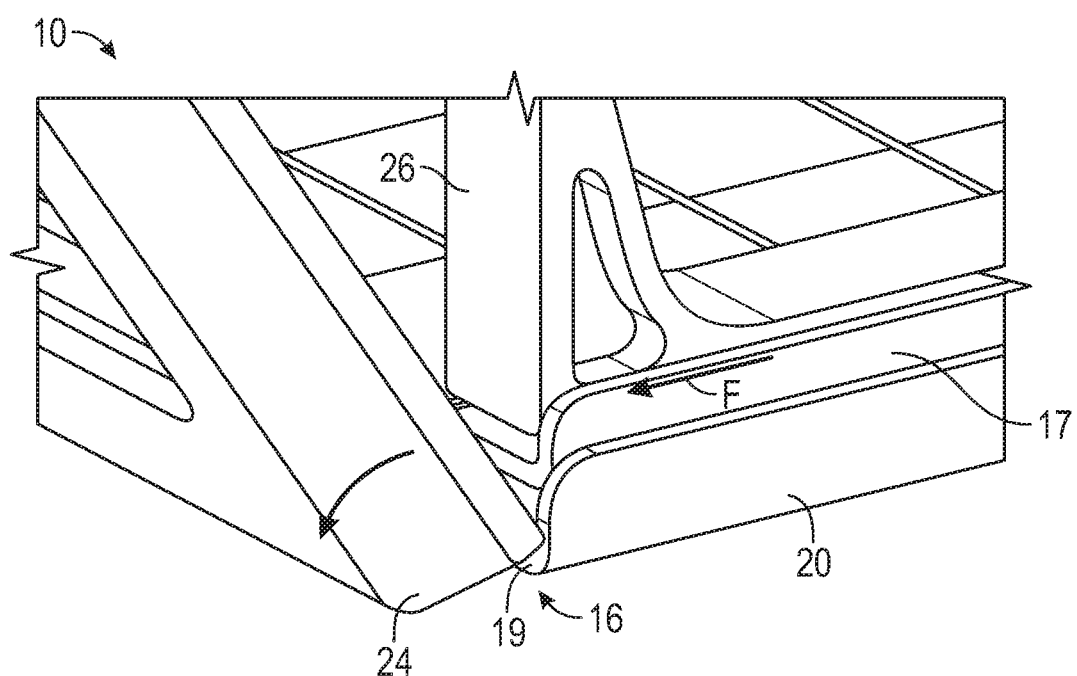
FIG. 6 is a partial detail side view of the system of FIG. 5.

In general, media patching system 10 includes a panel assembly 12 (e.g., patch panel assembly/multi-connector panel assembly 12). Exemplary panel assembly 12 includes a plurality of apertures 13 therethrough (FIG. 5). Each aperture 13 is typically configured and dimensioned to have at least one connector assembly/connective device 14 mounted with respect thereto.

One or more connector assemblies 14 can be mounted with respect to panel assembly 12, as described and disclosed in U.S. Pat. Nos. 8,439,702 and 8,672,709 noted above. Panel assembly 12 can include any number of connector assemblies 14 mounted thereon (e.g., one, two, three, four, a plurality, etc.).

An exemplary connector assembly 14 can take the form of a copper-based electrical connector assembly 14, and can include a jack housing (e.g., high density modular communication jack housing) that is adapted to receive signals from a mating connecting assembly (e.g., a plug connector, such as an RJ-45 plug or an IEC 60603-7-7 compliant plug) inserted or introduced to a receiving space of the jack housing. In general, the jack housing of electrical connector assembly 14 is suitable for use in various applications, e.g., for interfacing with high frequency data transfer media, connection to data transfer devices or the like, etc. For example, the jack housing of connector assembly 14 may be mounted to a printed circuit board (PCB) and signals may transfer from a plug connector introduced to the receiving space of connector assembly 14 to the PCB and then to insulation displacement contacts (IDCs), thus completing the data interface and transfer through assembly 14.

In other embodiments, panel assembly 12 can have one or more fiber-optic connector assemblies 14 mounted thereon (via apertures 13) as is shown and described in U.S. Pat. No. 9,606,317 noted above. Panel assembly 12 can include any number of fiber-optic connector assemblies 14 mounted thereon (e.g., one, two, three, four, a plurality, etc.).

For example, each connector fiber-optic assembly 14 can include one or more ports/adapters to facilitate communication with a mating assembly (e.g., fiber optic connector), that in turn can interact with various fiber optic media (fiber optic cables, etc.). The ports/adapters of assembly 14 are typically positioned for communication with fiber optic connectors introduced to a receiving space of connector assembly 14.

Other exemplary connector assemblies 14 can take the form of a fiber optic cassette 14 having a plurality of fiber optic ports/adapters (e.g., 12 ports) for mating with fiber optic connectors.

It is noted that panel assembly 12 of system 10 can include any number, combination and/or permutation of connector assemblies/connector devices 14. Thus, panel assembly 12 of system 10 advantageously provides users with the ability to install multiple (mixed) media connections (e.g., copper-based and/or fiber optic connections) in the same patching system/enclosure 10. Moreover, panel assembly 12 can advantageously increase patching density of the media patching system 10 while maintaining port accessibility.

Figure 3:
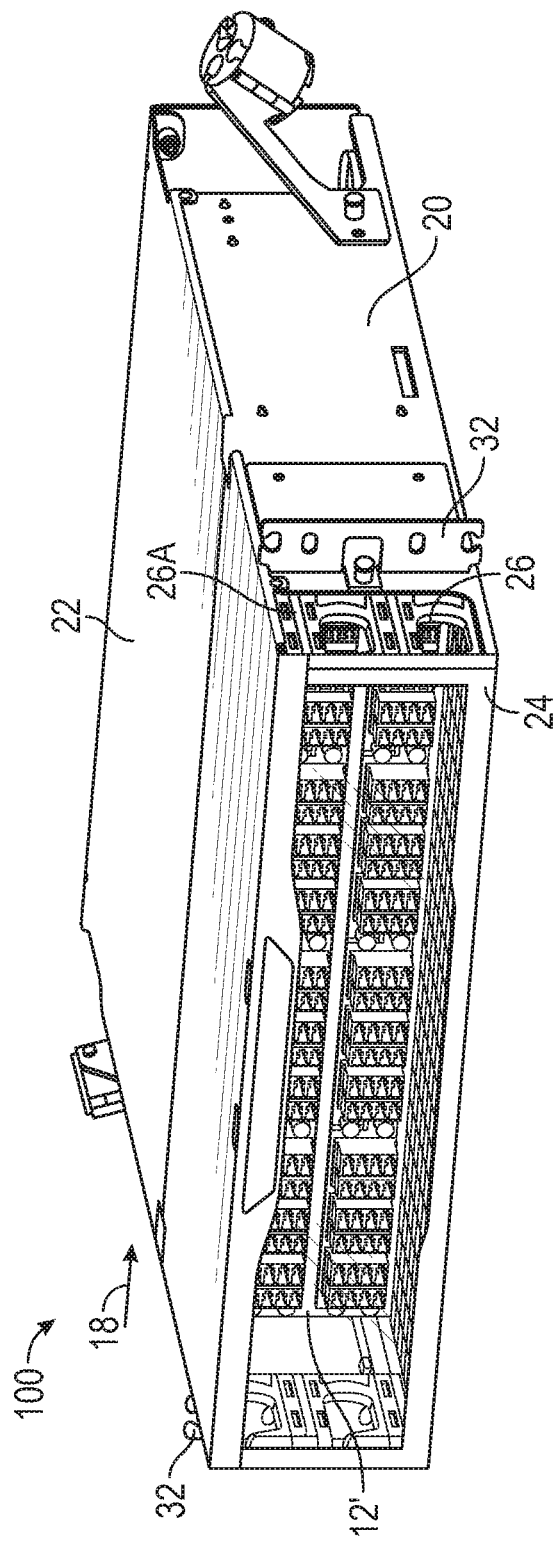
FIG. 3 is a side perspective view of another media patching system according to an exemplary embodiment of the present disclosure.
Figure 4:
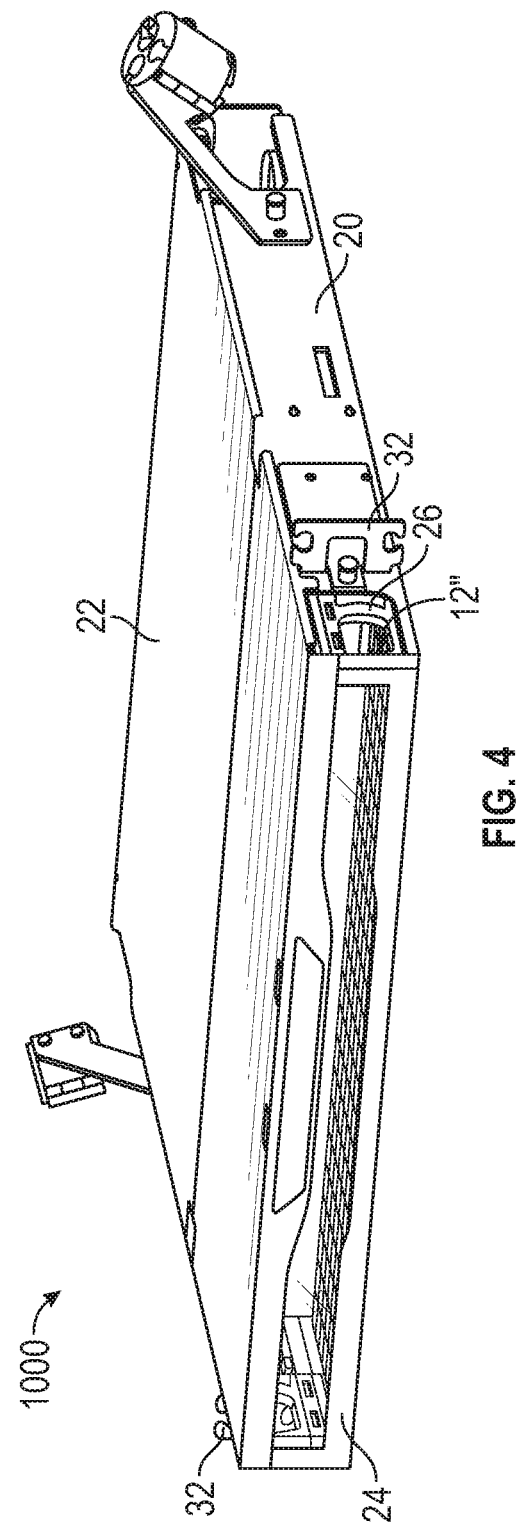
FIG. 4 is a side perspective view of another media patching system according to an exemplary embodiment of the present disclosure.

FIG. 3 shows an alternative patching system 100 having a different sized panel assembly 12'. FIG. 4 also shows an alternative patching system 1000 having a different sized panel assembly 12".

Figure 32:
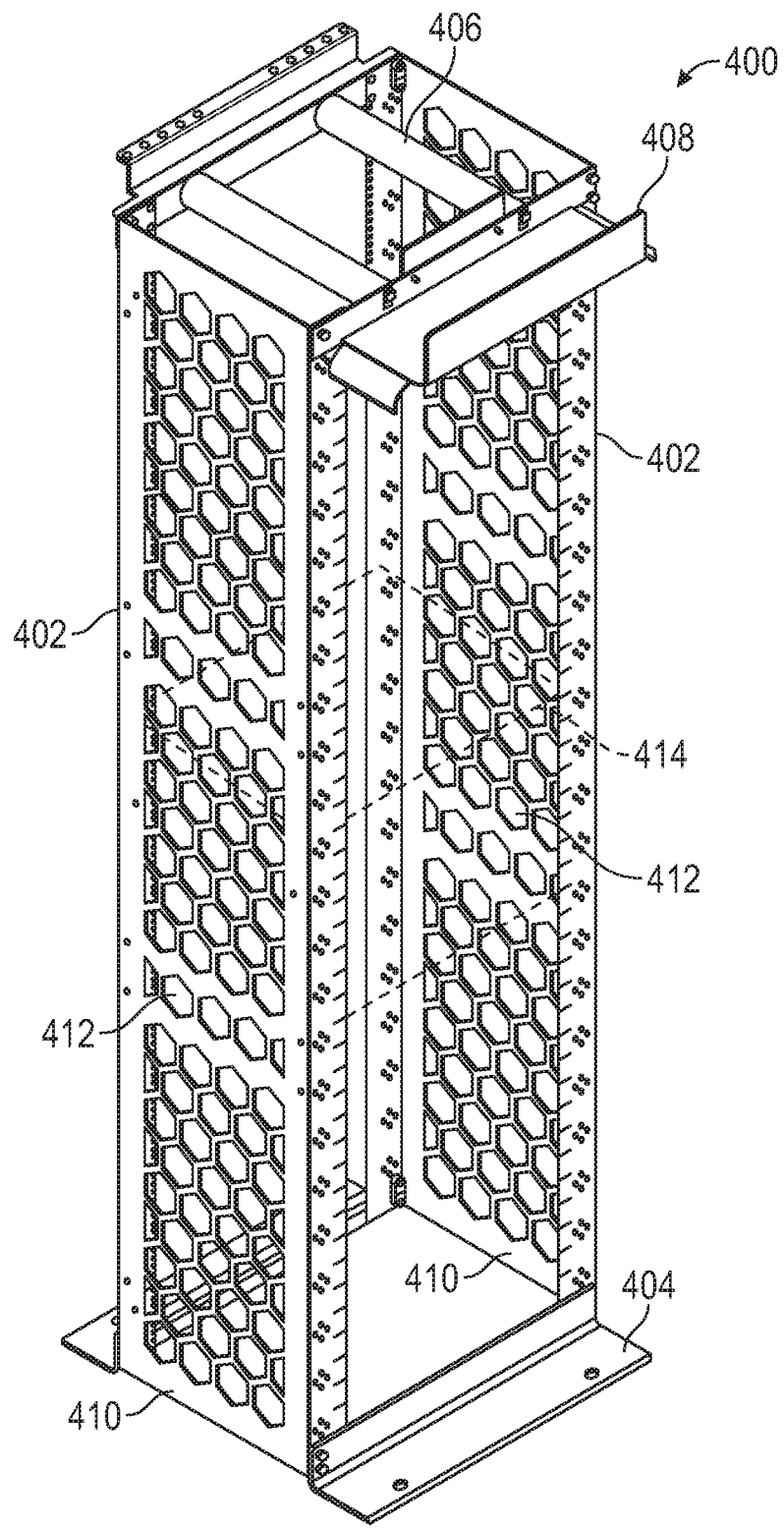
FIG. 32 is a perspective side view of an exemplary rack having ventilated side panels in accordance with embodiments of the present disclosure.

In general, media patching system 10 (or system 100 or 1000) is configured and dimensioned to be mounted with respect to a supporting structure 400 (e.g., rack 400—FIG. 32) or the like. As shown in FIG. 32, it is noted that exemplary media patching system 10, 100, 1000 is adapted for use in conjunction with a rack 400 (e.g., network or server rack) or the like, although the present disclosure is not limited thereto. Rather, the disclosed media patching system 10 (or 100/1000) is adapted for use in conjunction with other structures, such as, for example, frames, cabinets, supporting structures, or other structures that stand to benefit from proximate cable management functionality. For ease of disclosure, the potential structures to which the disclosed system 10, 100, 1000 may be mounted are collective referred to as "rack(s)." However, it is to be understood that the present disclosure is not limited by or to implementations wherein the disclosed system 10, 100, 1000 is mounted with respect to, or used in conjunction with, a rack 400, but may be mounted with respect to, or used in conjunction with other structures/units (e.g., structures/units associated with cable routing).

One or more media patching systems 10, 100, 1000 can be mounted with respect to rack 400 or the like. Any suitable number of systems 10, 100, 1000 can be mounted with respect to rack 400.

Exemplary rack 400 is depicted in FIG. 32, and other exemplary mounting structures suitable for use with systems 10, 100, 1000 are described and disclosed in U.S. Pat. No. 7,983,038, which is hereby incorporated by reference in its entirety. However and as noted above, system 10, 100, 1000 may be mounted with respect to or used in conjunction with other structures/units.

As shown in FIG. 32, an exemplary rack 400 is depicted. In certain embodiments, rack 400 defines a rectangular frame, and can include two or more upright members 402. The upright members 402 can be attached to a base 404 at a bottom margin of the frame. The upright members 402 may further be attached to a top member 406. The top member 406 may include a waterfall 408 for facilitating the formation of appropriately large bend radii in cables mounted with respect to the rack 400.

Each of the upright members 402 may include side panel 410. Each side panel 410 may include a plurality of vent holes/apertures 412 for facilitating the passage of air through the side panel 410. For example, rack 400 is operable as a component of a ventilation system for delivering an improved flow of cooling air to one or more heat generating devices (one of which is shown schematically in FIG. 32 at reference numeral 414) mounted in the rack 400 through the vent holes 412 of a side panel 410, and/or to promote an effective flow of warm exhaust air through the vent holes 412 of a side panel 410.

Referring back to FIGS. 1-6, exemplary system 10, 100, 1000 includes a base member 16, tray member 17, left side wall 18, right side wall 20 and top cover member 22. In exemplary embodiments and as shown in FIGS. 10, 23, 26, and 29, top cover 22 includes a top front cover 22A and a top rear cover 22B. The covers 22A, 22B are split at the center of the flange at the top of the left and right side walls 18, 20 of the base 16.

System 10 also includes a front door member 24 and a rear door member 25, with each door member 24, 25 configured to open, close, lock and/or unlock as desired by a user.

Figure 8:
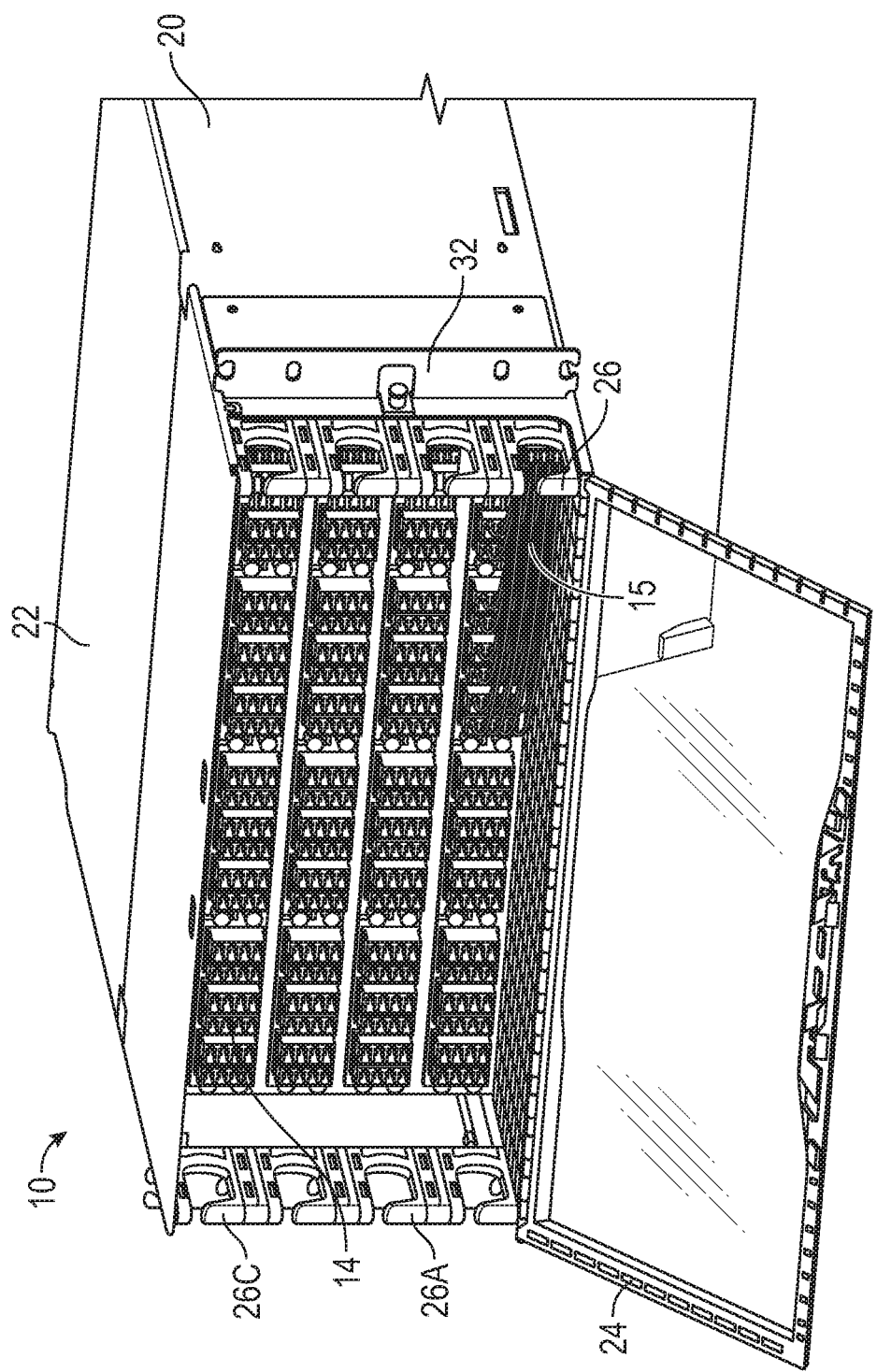
FIG. 8 is another side perspective view of the system of FIG. 1.

At least one cable manager member 26 can be mounted with respect to system 10 for cable/wire management purposes of system 10. In general, each cable manager member 26 is configured to house or secure cables/fibers 15 for cable management purposes (FIG. 8).

As discussed further below, system 10 can include one or more cable management spool assemblies 28 or the like removably mounted thereon for cable/wire management purposes of system 10.

As shown in FIG. 5, exemplary tray member 17 is attached to front door member 24 (e.g., via hinges and/or hinge-knuckles), and tray member 17 is movable/slidable relative to base member 16. As such, when the front door member 24 opens, a cam surface 19 of the base member 16 cams against the door member 24, thereby moving the tray member 17 forward in the direction of Arrow F (FIG. 6) by this camming action. This thereby allows the door member 24 to fully swing open and not interfere with equipment below system 10. It also allows a user to further pull the door 24 and tray 17 forward in the direction of arrow F to the position shown in FIG. 5.

It is also noted that the base member 16 can include one or more tab members or the like that provide the camming surface and camming action against the door member 24 to move the tray member 17 forward in the direction of Arrow F (FIG. 6) by this camming action/surface when the door member 24 is opened.

As noted, system 10 can include at least one cable manager member 26 mounted with respect to system 10 for cable/wire management purposes of system 10. In general, each cable manager member 26 is configured to house or secure cables/fibers 15 for cable management purposes (FIG. 8).

Figure 7A:
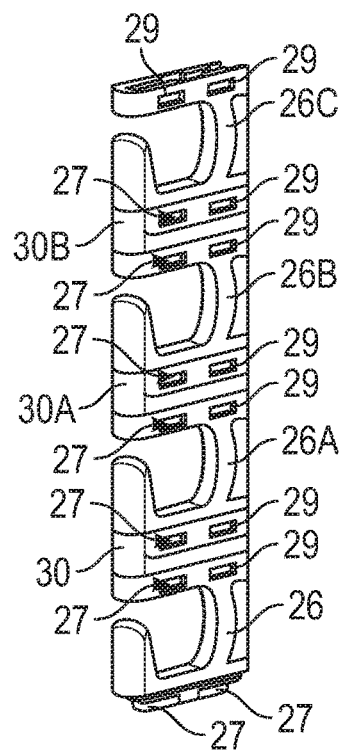
FIGS. 7A-7B are side perspective views of stackable cable manager members according to an exemplary embodiment of the present disclosure.
Figure 7B:
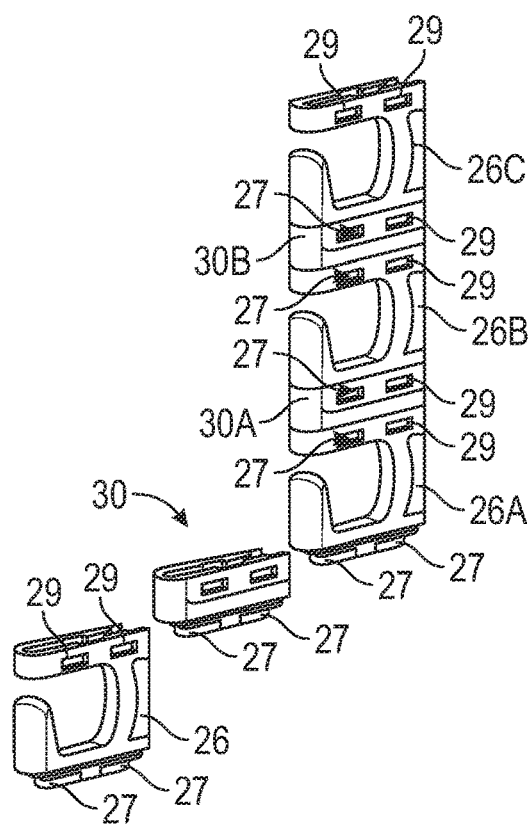

As shown in FIGS. 7A-7B, each cable manager member 26 includes one or more protrusion members 27. The protrusion members 27 are configured to mount or snap fit into one or more mating members of tray member 17, and are also configured to mount or snap fit into one or more mating members 29 of spacer member 30 or of cable manager member 26.

As shown in FIGS. 7A-7B and 8, exemplary system 10 includes four cable manager members 26 mounted proximal to right side wall 20 (and four members 26 similarly mounted proximal to left side wall 18). First cable manager member 26 is mounted to tray member 17 via protrusion members 27 mounted into mating members of tray member 17. A first spacer member 30 can be mounted to the top of the first cable manager member 26, with protrusion members 27 of first spacer member 30 mounted to mating members 29 of first cable manager member 26.

Second cable manager member 26A is mounted to first spacer member 30 via protrusion members 27 mounted into mating members 29 of first spacer member 30. A second spacer member 30A can be mounted to the top of the second cable manager member 26A, with protrusion members 27 of second spacer member 30A mounted to mating members 29 of second cable manager member 26A.

Third cable manager member 26B is mounted to second spacer member 30A via protrusion members 27 mounted into mating members 29 of second spacer member 30A. A third spacer member 30B can be mounted to the top of the third cable manager member 26B, with protrusion members 27 of third spacer member 30B mounted to mating members 29 of third cable manager member 26B.

Fourth cable manager member 26C is mounted to third spacer member 30B via protrusion members 27 mounted into mating members 29 of third spacer member 30B.

In general, each spacer member 30, 30A, 30B is configured to add height to the mounted cable manager members 26, 26A, 26B, 26C. As such and as shown in FIG. 8, system 10 with mounted cable manager members 26, 26A, 26B, 26C and mounted spacer member 30, 30A, 30B provides support for cables/fibers 15, and also provide for the grouping of cables/fibers 15 in relation to connector assembly 14 location relative to panel assembly 12 of system 10 (e.g., cables/fibers 15 proximal to member 26 near right wall 20 can be housed, grouped and/or secured via member 26).

In other embodiments, system 10 does not include spacer members 30, 30A, 30B, and the protrusion members 27 of second member 26A are mounted directly to mating members 29 of first member 26, and the protrusion members 27 of third member 26B are mounted directly to mating members 29 of second member 26A, and the protrusion members 27 of fourth member 26C are mounted directly to mating members 29 of third member 26B.

In general, each exemplary cable manager member 26, 26A, 26B, 26C is C-shaped or the like, with each C-shaped cable manager member 26 configured to house or secure cables/fibers 15 for cable/fiber management purposes (FIG. 8), although the present disclosure is not limited thereto. Rather, each cable manager member 26, 26A, 26B, 26C can take a variety of shapes/designs.

In another embodiment and as shown in FIG. 4, system 1000 can include only one cable manager member 26 on each side 18, 20. In other embodiment and as shown in FIG. 3, system 100 can include a first and second member 26, 26A on each side 18, 20, with the first member 26 mounted to tray 17, and with the protrusion members 27 of second member 26A mounted directly to mating members 29 of first member 26.

With reference now to FIGS. 1, 2 and 9-11, exemplary system 10 includes a mounting bracket assembly 32 that is mountable to left side wall 18, and a mounting bracket assembly 32 that is mountable to right side wall 20.

Each mounting bracket assembly 32 includes a bracket ear member 34 and a plunger member 35 mounted to bracket ear member 34. Each bracket ear member 34 is configured to be mounted to rack member 400 (FIG. 32) or the like via mounting slots 36 of bracket ear member 34.

Figure 9:
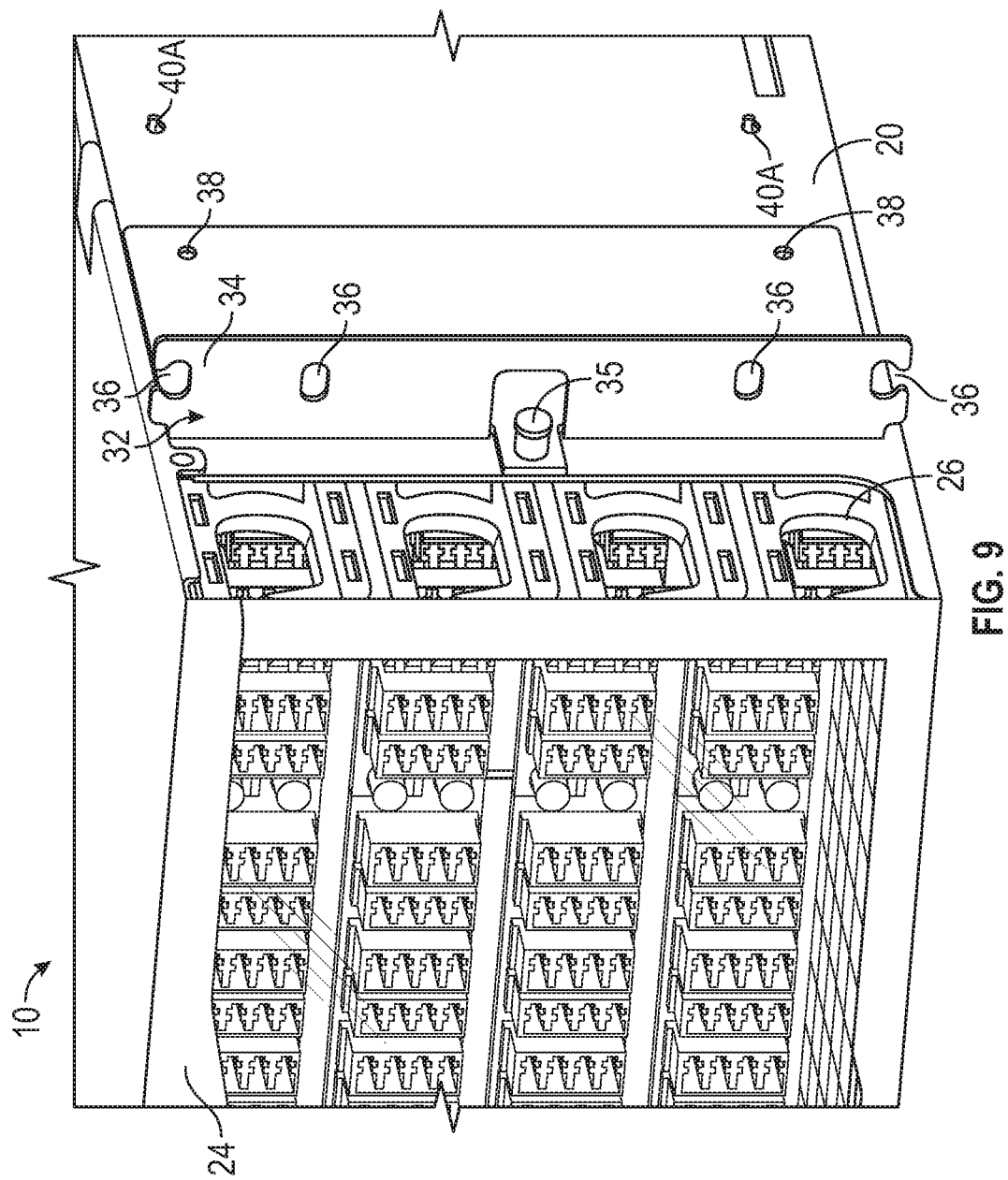
FIGS. 9-11 are partial side perspective views of the system of FIG. 1.

FIG. 9 depicts assembly 32 mounted in a first position to right side wall 20, with plunger member 35 releasably mounted to first aperture 21 of wall 20 (FIG. 10), and with pin members 38 (e.g., key pin insert members 38) of assembly 32 releasably mounted to first keyhole slots 40 of wall 20.

In general, each keyhole slot 40 defines a circular shape/section 41 including a slot/section 43 extending therefrom (e.g., a keyhole aperture 40).

Figure 11:
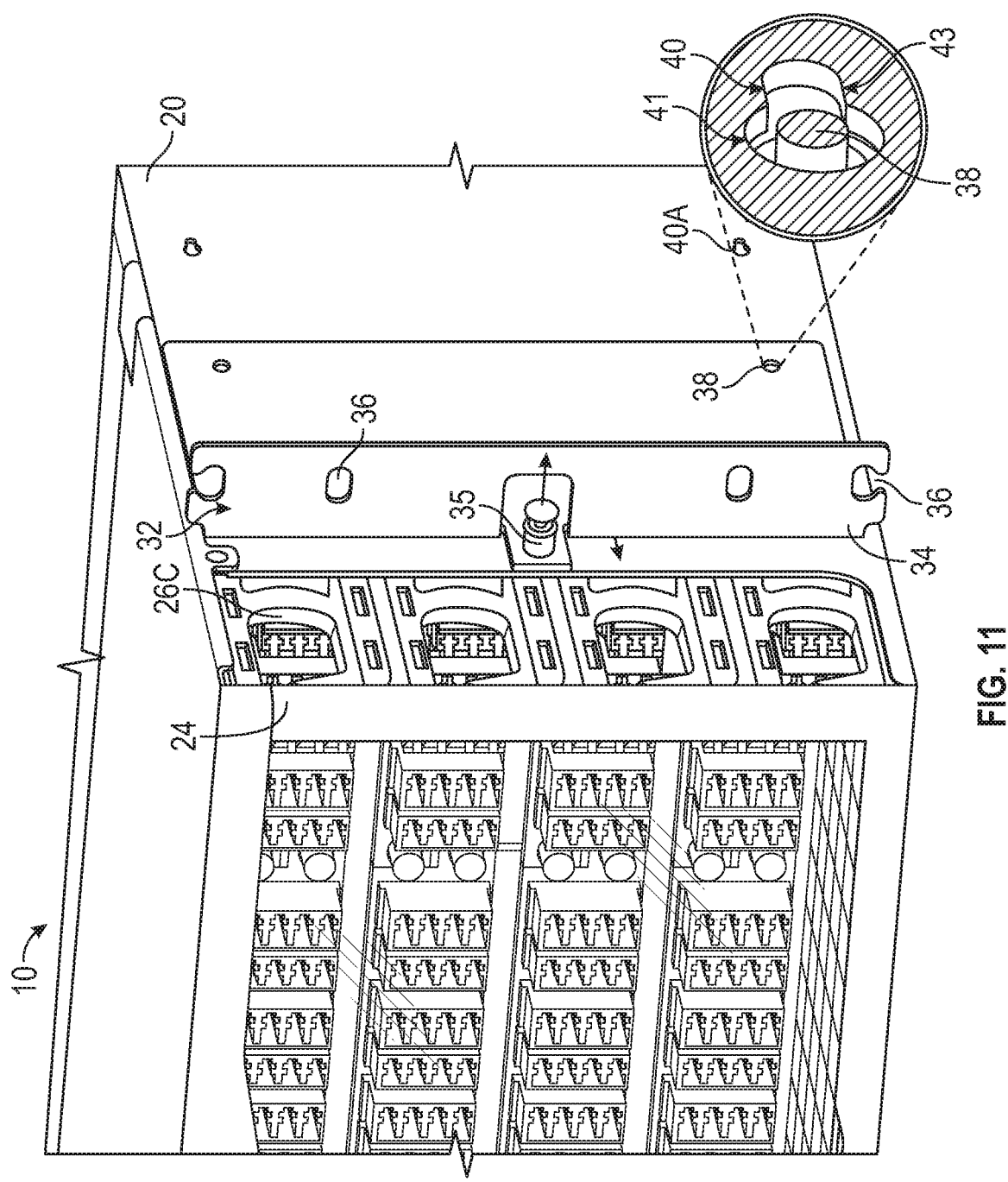

As shown in FIG. 11, a user can pull the plunger member 35 away from right side wall 20, thereby releasing plunger 35 from first aperture 21 of wall 20. The bracket assembly 32 can then be moved toward front door 24, which thereby positions the pin members 38 from the smaller section 43 to the larger section 41 of first keyhole slots 40, which allows the user to move the pin members 38 away from first keyhole slots 40.

Figure 10:
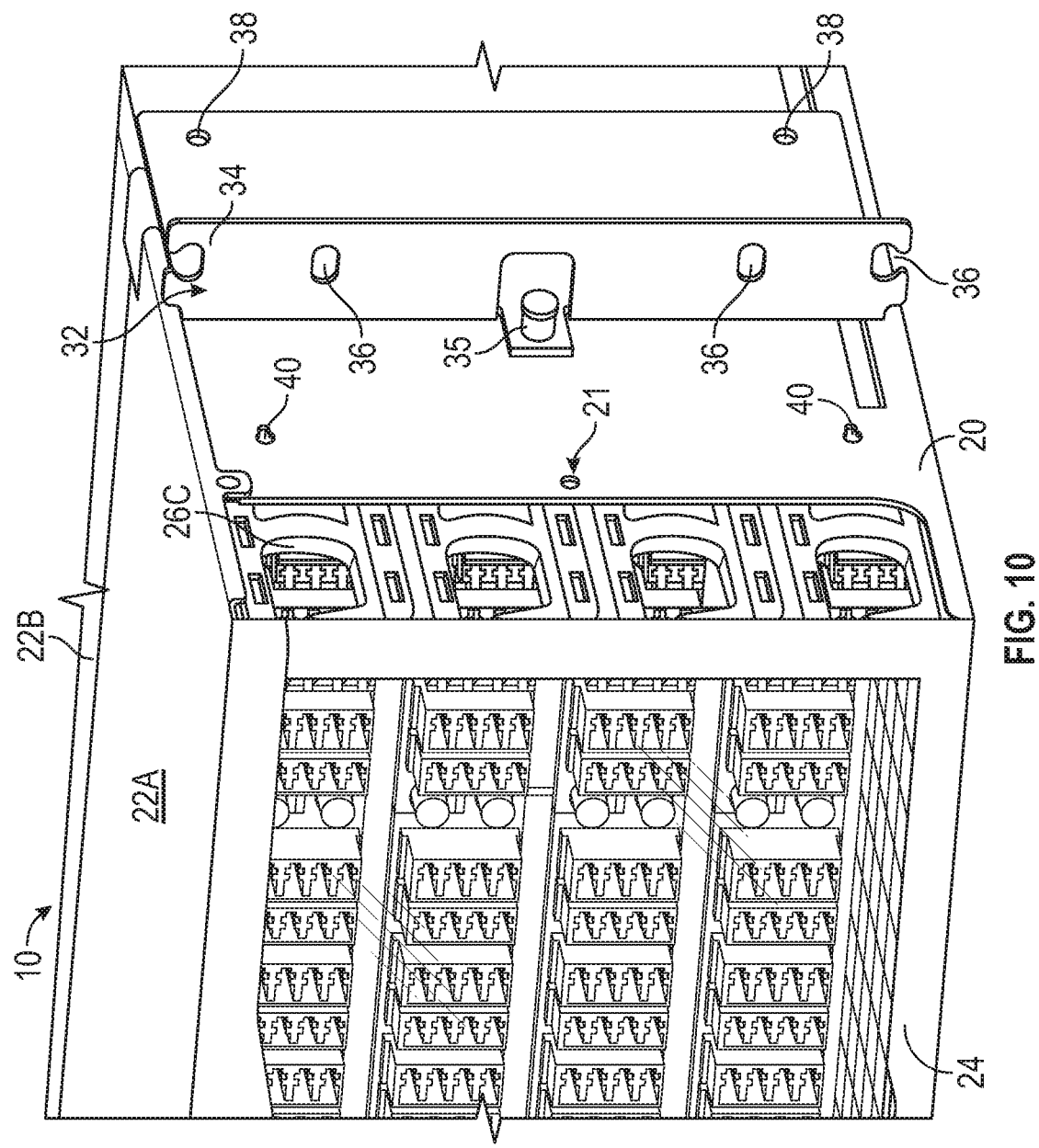

A user can then move the bracket assembly 32 toward the rear door 25 to the second position shown in FIG. 10, with the plunger member 35 releasably mounted to a second aperture of wall 20, and with the pin members 38 of assembly 32 releasably mounted to second keyhole slots 40A of wall 20.

A user can thus advantageously move the bracket assembly 32 from the first position shown in FIG. 9 to the second position shown in FIG. 10, and vice versa, without the use of tools, to thereby give the user multiple mounting options of system 10 to rack 400 or the like. It is noted that assembly 32 on left side 18 can be mounted and moved as described relative to assembly 32 of right side 20.

In other embodiments and as shown in FIGS. 33-41, system 10, 100, 1000 includes a mounting bracket assembly 32 that is mountable to right side wall 20 (and can include a mounting bracket assembly 32 that is mountable to left side wall 18).

Each mounting bracket assembly 32 includes a bracket ear member 34 and a plunger member 35 mounted to bracket ear member 34. Each bracket ear member 34 is configured to be mounted to rack member 400 (FIG. 32) or the like via mounting slots 36 of bracket ear member 34.

Figure 33:
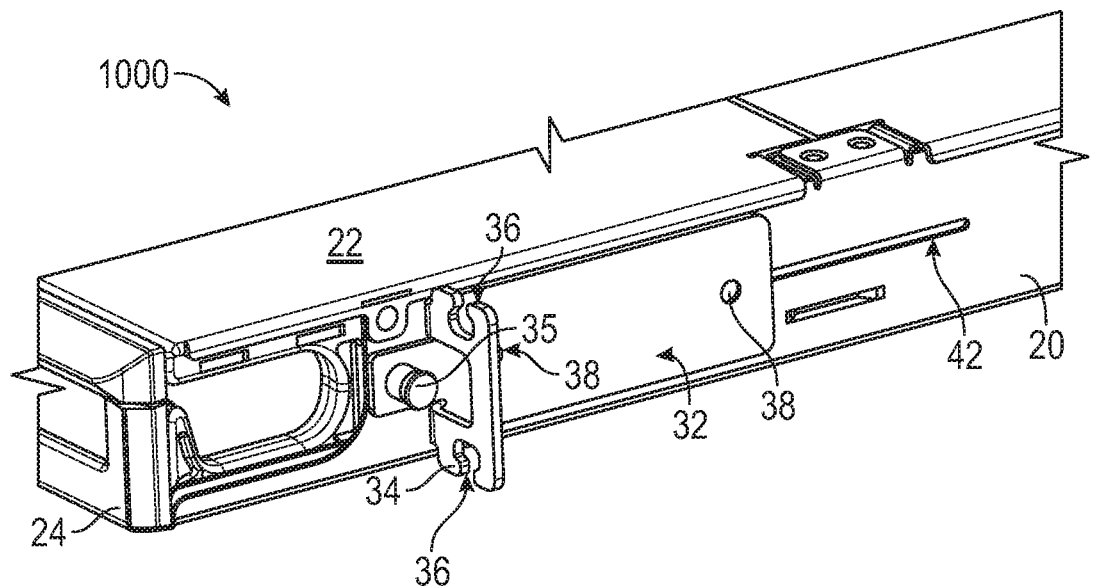
FIGS. 33-35 are partial side perspective views of another media patching system according to an exemplary embodiment of the present disclosure.
Figure 36:
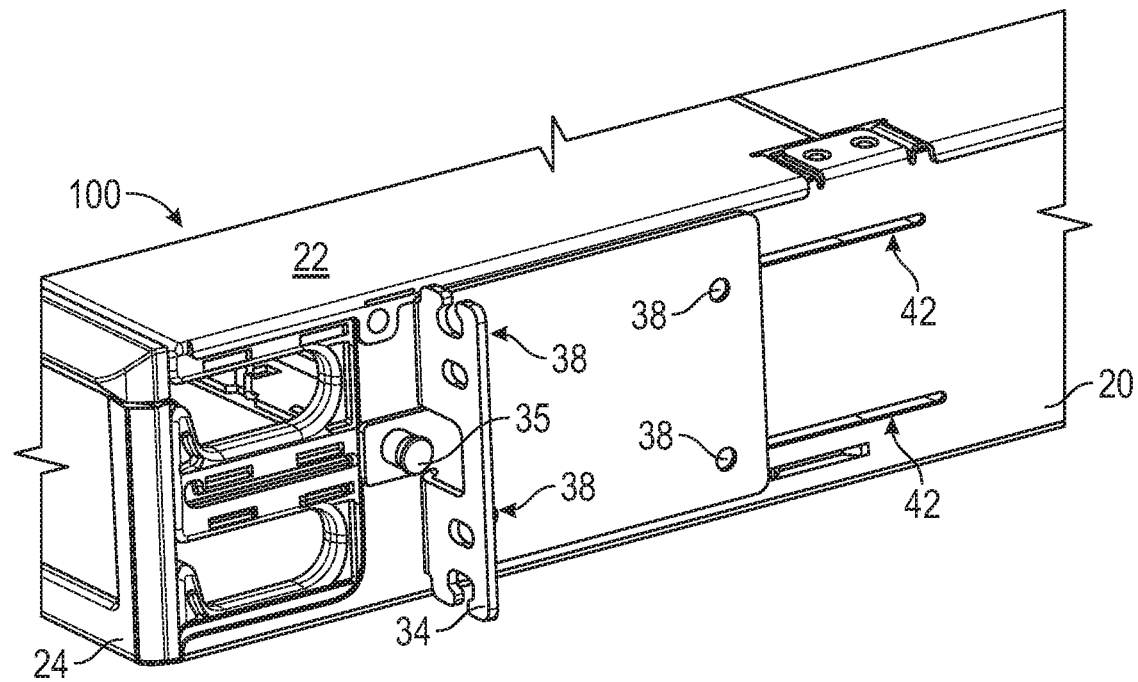
FIGS. 36-38 are partial side perspective views of another media patching system according to an exemplary embodiment of the present disclosure.
Figure 37:
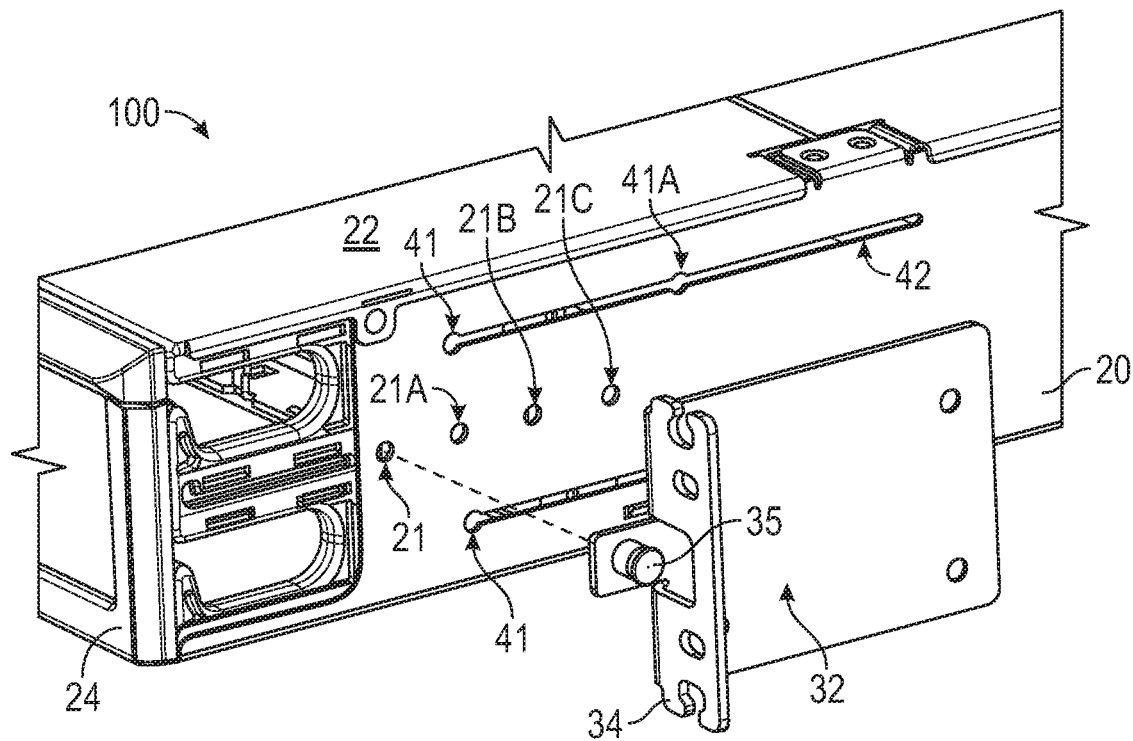
Figure 38:
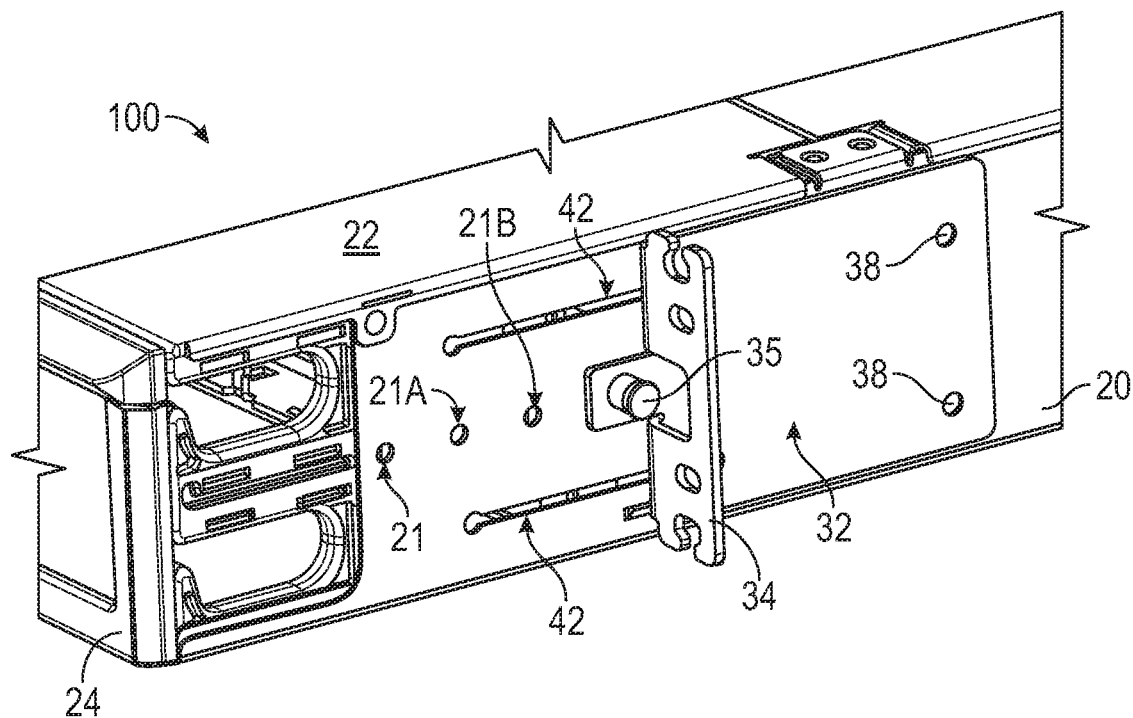
Figure 39:
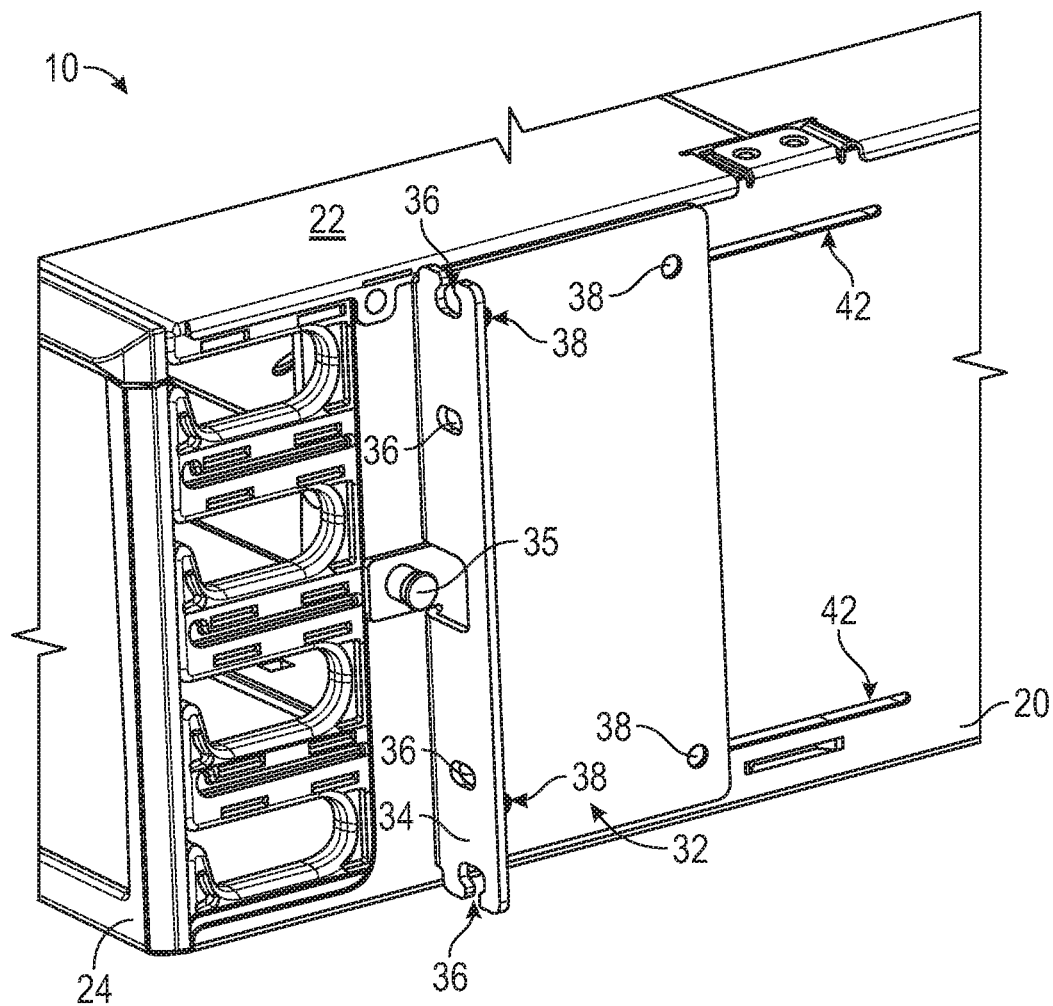
FIGS. 39-41 are partial side perspective views of another media patching system according to an exemplary embodiment of the present disclosure.
Figure 40:
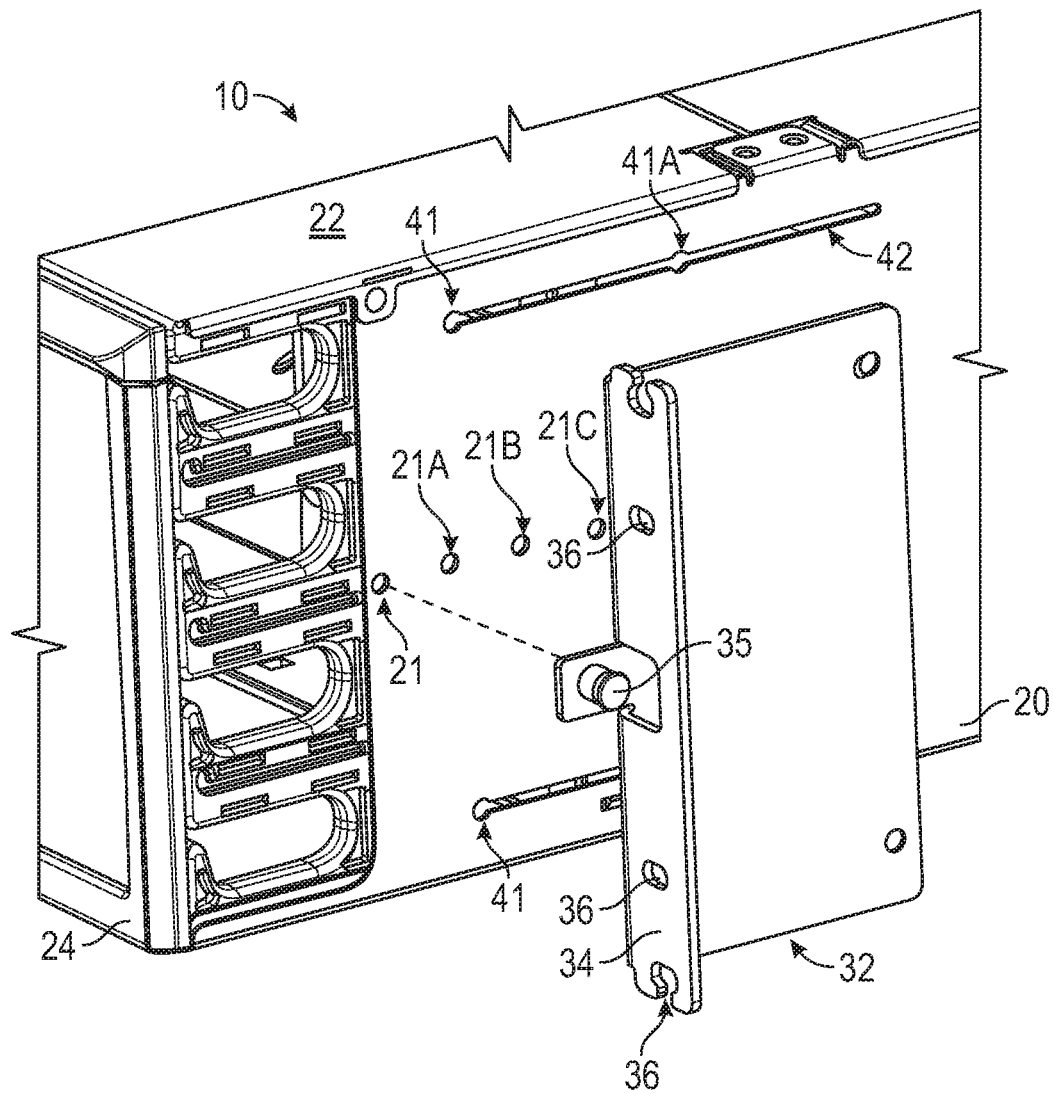
Figure 41:
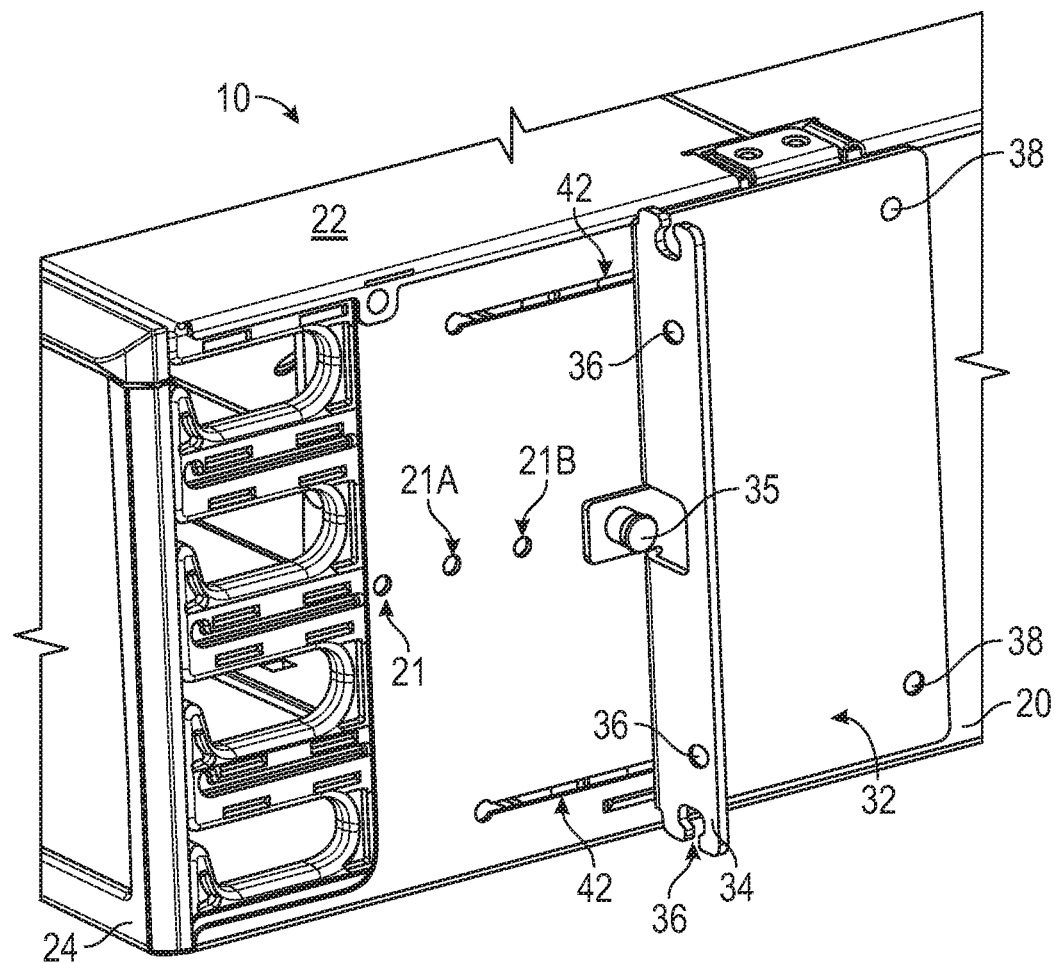

FIGS. 33, 36 and 39 depict assembly 32 mounted in a first position to right side wall 20, with plunger member 35 releasably mounted to first aperture 21 of wall 20, and with one or more pin members 38 (e.g., key pin insert members 38) of assembly 32 releasably mounted to one or more slots 42 of wall 20.

In certain embodiments and as shown in FIGS. 36-41, right side wall 20 includes two slots 42, and right side wall 20 includes first aperture 21, second aperture 21A, third aperture 21B and fourth aperture 21C. Each slot 42 of system 10, 100 of FIGS. 36-41 can include a forward circular shape/section 41 and rear circular shape/section 41A.

In exemplary embodiments and in the positions shown in FIGS. 36 and 39, a user can pull the plunger member 35 away from right side wall 20, thereby releasing plunger 35 from first aperture 21 of wall 20. To remove bracket assembly 32 from right side wall 20, the bracket assembly 32 can then be moved toward front door 24, which thereby positions the forward pin members 38 into respective forward circular shape/sections 41, and positions the rear pin members 38 into respective rear circular shape/sections 41A, which thereby allows the user to move the pin members 38 away from slots 42 and remove assembly 32 from wall 20.

In certain embodiments, it is noted that assembly 32 of system 10, 100 can only be removed from wall 20 when the plunger member 35 is positioned relative to and released from first aperture 21 (and with the forward pin members 38 positioned relative to and released from forward circular shape/sections 41, and with the rear pin members 38 positioned relative to and released from rear circular shape/sections 41A).

To move the bracket assembly 32 to different positions relative to right side wall and with reference to the positions shown in FIGS. 36 and 39, a user can pull the plunger member 35 away from right side wall 20, thereby releasing plunger 35 from first aperture 21 of wall 20.

A user can then move the bracket assembly 32 toward the rear door 25 to a second position with the plunger member 35 releasably mounted to second aperture 21A of wall 20, and with the pin members 38 of assembly 32 releasably mounted within respective slots 42 of wall 20.

A user can then pull the plunger member 35 away from right side wall 20, thereby releasing plunger 35 from second aperture 21A of wall 20. A user can then move the bracket assembly 32 toward the rear door 25 to a third position with the plunger member 35 releasably mounted to third aperture 21B of wall 20, and with the pin members 38 of assembly 32 releasably mounted within respective slots 42 of wall 20.

A user can then pull the plunger member 35 away from right side wall 20, thereby releasing plunger 35 from third aperture 21B of wall 20. A user can then move the bracket assembly 32 toward the rear door 25 to a fourth position with the plunger member 35 releasably mounted to fourth aperture 21B of wall 20, and with the pin members 38 of assembly 32 releasably mounted within respective slots 42 of wall 20.

It is noted that a user can then move the assembly 32 forward toward front door member 24 in a similar manner so that the plunger member 35 is thereafter mounted in third, second or first apertures 21B, 21A, 21, as desired. A user can thus move and releasably mount assembly 32 forward and backward relative to wall 20, as desired, and can remove assembly 32 from wall 20, if desired.

A user can thus advantageously move the bracket assembly 32 from the first position (plunger 35 in first aperture 21) to the second position (plunger 35 in second aperture 21A) and vice versa, and then move the bracket assembly 32 from the second position (plunger 35 in second aperture 21A) to the third position (plunger 35 in third aperture 21B) and vice versa, and then move the bracket assembly 32 from the third position (plunger 35 in third aperture 21B) to the fourth position (plunger 35 in fourth aperture 21C) and vice versa, without the use of tools, to thereby give the user multiple mounting options of system 10, 100 to rack 400 or the like. It is noted that assembly 32 on left side 18 can be mounted and moved as described relative to assembly 32 of right side 20.

Figure 34:
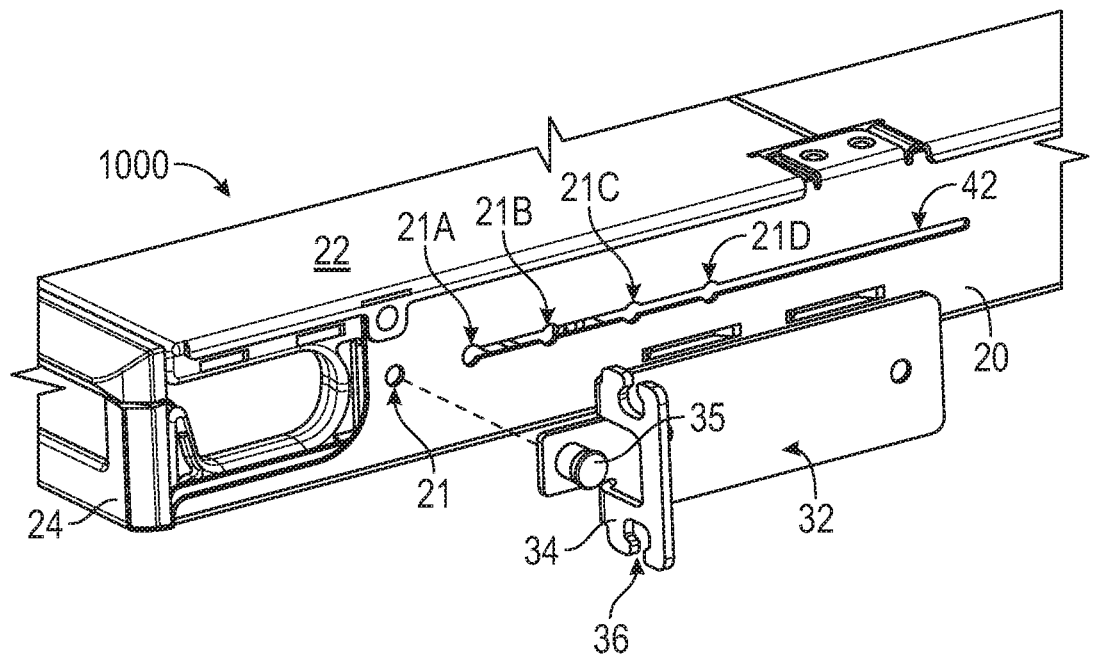
Figure 35:
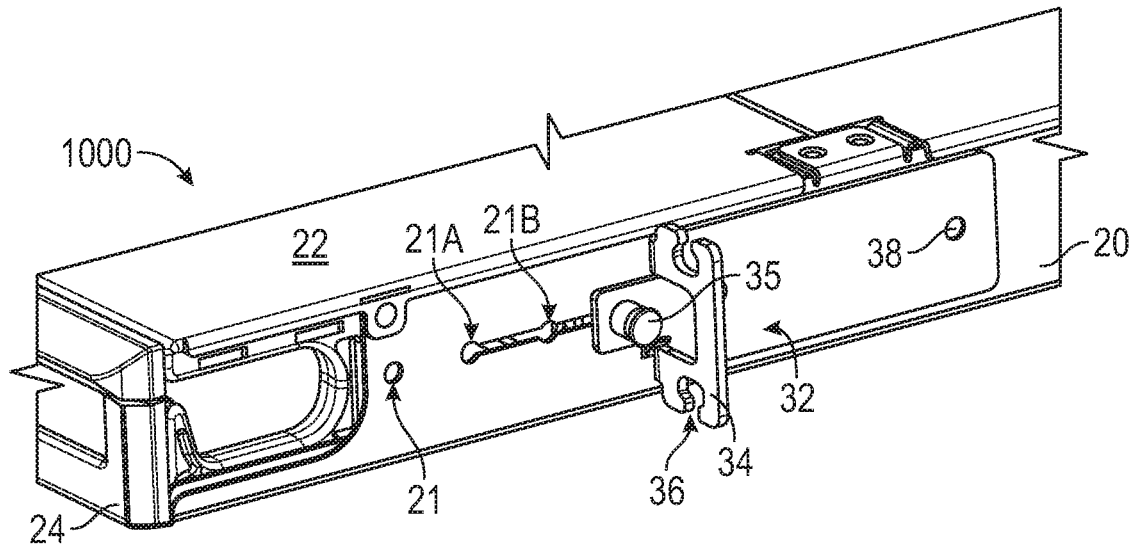

In other embodiments and as shown in FIGS. 33-35, right side wall 20 includes one slot 42, and right side wall 20 includes first aperture 21, second aperture 21A, third aperture 21B and fourth aperture 21C, and with apertures 21A, 21B, 21C positioned within slot 42. It is noted that right side wall 20 of system 1000 (FIG. 34) can also include fifth aperture 21D positioned within slot 42.

In exemplary embodiments and in the position shown in FIG. 33, a user can pull the plunger member 35 away from right side wall 20, thereby releasing plunger 35 from first aperture 21 of wall 20. To remove bracket assembly 32 from right side wall 20, the bracket assembly 32 can then be moved toward front door 24, which thereby positions the forward pin member 38 into second aperture 21A, and positions the rear pin member 38 into fifth aperture 21D, which thereby allows the user to move the pin members 38 away from slot 42 and remove assembly 32 from wall 20.

In certain embodiments, it is noted that assembly 32 of system 1000 can only be removed from wall 20 when the plunger member 35 is positioned relative to and released from first aperture 21 (and with the forward pin member 38 positioned relative to and released from second aperture 21A, and with the rear pin member 38 positioned relative to and released from fifth aperture 21D).

To move the bracket assembly 32 to different positions relative to right side wall 20 and with reference to the position shown in FIG. 36, a user can pull the plunger member 35 away from right side wall 20, thereby releasing plunger 35 from first aperture 21 of wall 20.

A user can then move the bracket assembly 32 toward the rear door 25 to a second position with the plunger member 35 releasably mounted to second aperture 21A of wall 20, and with the pin members 38 of assembly 32 releasably mounted within the slot 42 of wall 20.

A user can then pull the plunger member 35 away from right side wall 20, thereby releasing plunger 35 from second aperture 21A of wall 20. A user can then move the bracket assembly 32 toward the rear door 25 to a third position with the plunger member 35 releasably mounted to third aperture 21B of wall 20, and with the pin members 38 of assembly 32 releasably mounted within the slot 42 of wall 20.

A user can then pull the plunger member 35 away from right side wall 20, thereby releasing plunger 35 from third aperture 21B of wall 20. A user can then move the bracket assembly 32 toward the rear door 25 to a fourth position with the plunger member 35 releasably mounted to fourth aperture 21C of wall 20, and with the pin members 38 of assembly 32 releasably mounted within the slot 42 of wall 20.

It is noted that a user can then move the assembly 32 forward toward front door member 24 in a similar manner so that the plunger member 35 is thereafter mounted in third, second or first apertures 21B, 21A, 21, as desired. A user can thus move and releasably mount assembly 32 forward and backward relative to wall 20, as desired, and can remove assembly 32 from wall 20, if desired.

A user can thus advantageously move the bracket assembly 32 from the first position (plunger 35 in first aperture 21) to the second position (plunger 35 in second aperture 21A) and vice versa, and then move the bracket assembly 32 from the second position (plunger 35 in second aperture 21A) to the third position (plunger 35 in third aperture 21B) and vice versa, and then move the bracket assembly 32 from the third position (plunger 35 in third aperture 21B) to the fourth position (plunger 35 in fourth aperture 21C) and vice versa, without the use of tools, to thereby give the user multiple mounting options of system 1000 to rack 400 or the like. It is noted that assembly 32 on left side 18 of system 1000 can be mounted and moved as described relative to assembly 32 of right side 20.

With reference to FIGS. 33-41, it is noted that assemblies 32 of systems 10, 100, 1000 advantageously allow for movable depth adjustment relative to rack 400 or the like (e.g., mounting of assembly 32 to the first, second, third or fourth positions relative to wall 20), the depth adjustment of system 10, 100, 1000 relative to rack 400 being accomplished either before the system 10, 100, 1000 is mounted to rack 400, or even after system 10, 100, 1000 is mounted to rack.

With reference now to FIGS. 1, 2, 12-18 and 31, exemplary system 10 includes a rear cable management assembly 44A mountable to left side wall 18, and a rear cable management assembly 44 mountable to right side wall 20.

Each rear cable management assembly 44, 44A includes an extending portion 46 and a plunger member 48 mounted to extending portion 46. Each extending portion 46 extends to a retainer section 50, discussed further below.

Figure 12:
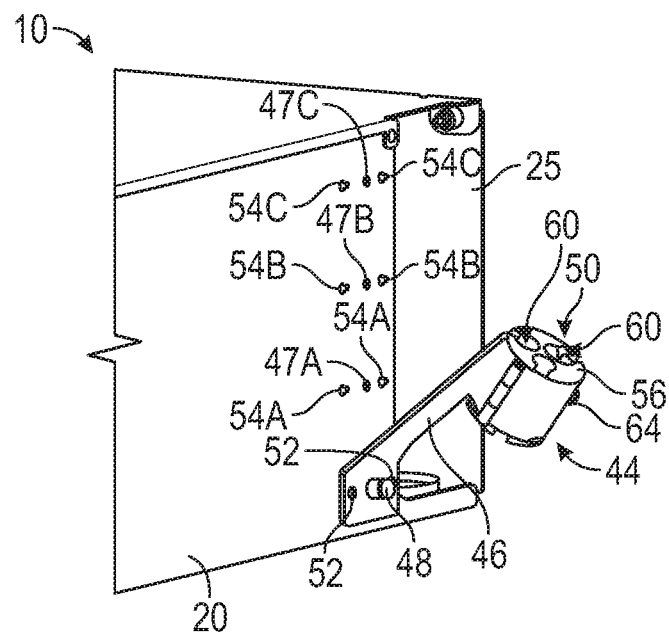
FIGS. 12-15 are partial side perspective views of the system of FIG. 1.

FIG. 12 depicts assembly 44 mounted in a first position to right side wall 20, with plunger member 48 releasably mounted to first opening 47 of wall 20 (FIG. 13), and with pin members 52 (e.g., key pin insert members 52) of assembly 44 releasably mounted to first rear keyhole slots 54 of wall 20.

In general, each keyhole slot 54 defines a circular shape/section 141 including a slot/section 143 extending therefrom (e.g., a keyhole aperture 54).

Figure 15:
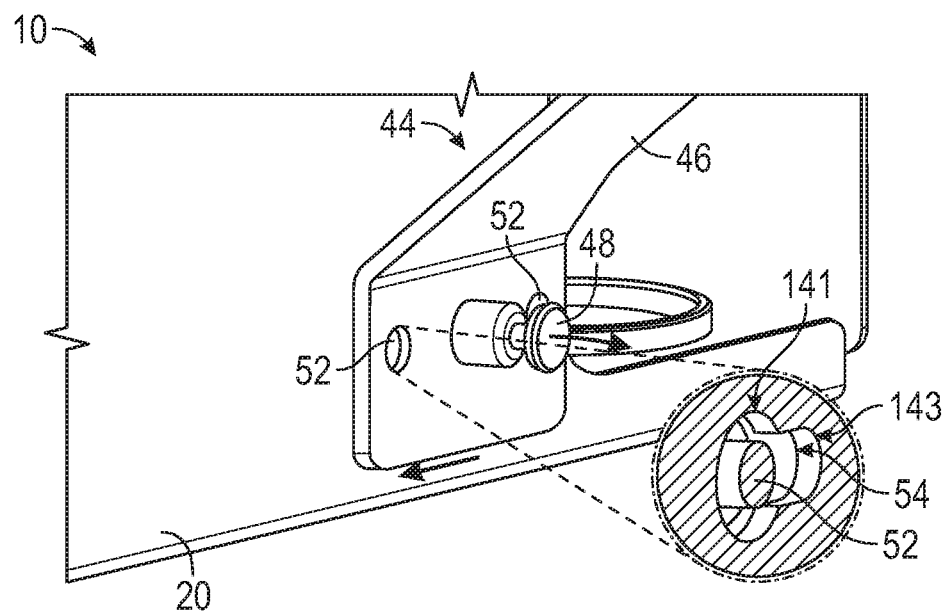
Figure 16:
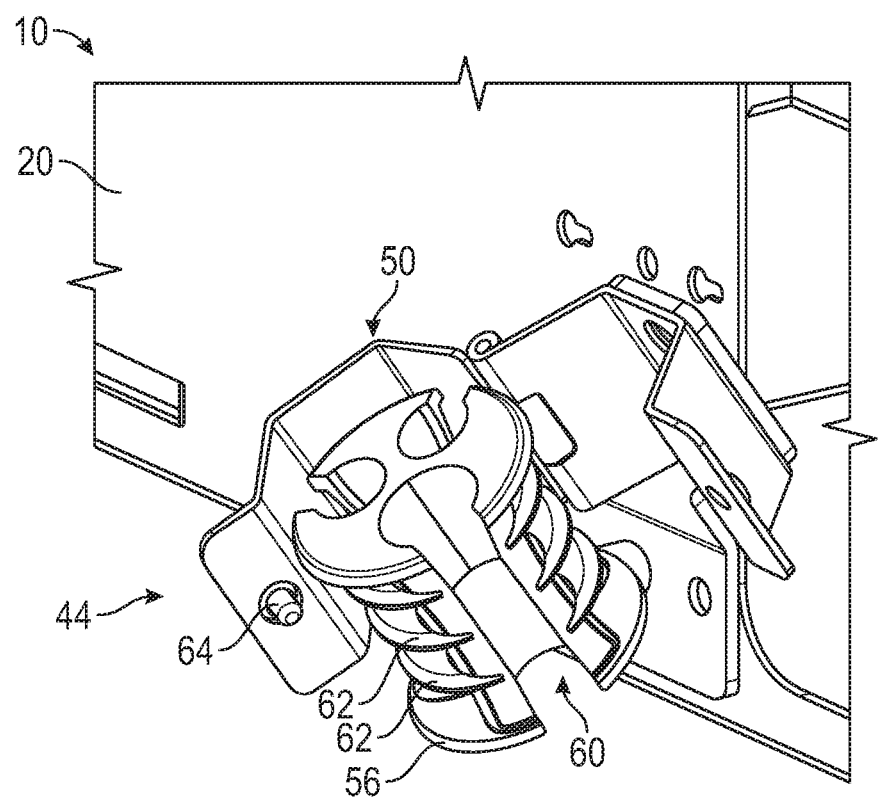
FIGS. 16-18 are partial side perspective views of the system of FIG. 1.

As shown in FIG. 15, a user can pull the plunger member 48 away from right side wall 20, thereby releasing plunger 48 from first opening 47 of wall 20. The assembly 44 can then be moved toward front door 24, which thereby positions the pin members 52 from the smaller section 143 to the larger section 141 of first rear keyhole slots 54, which allows the user to move the pin members 52 away from first rear keyhole slots 54.

Figure 13:
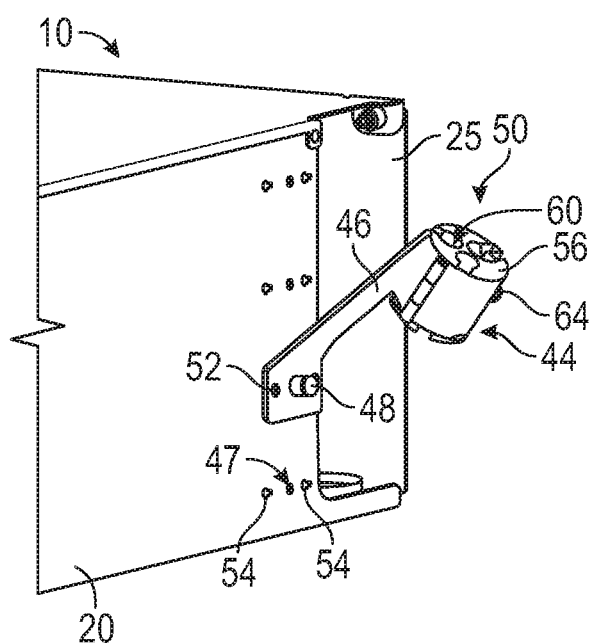

A user can then move the assembly 44 toward the top cover 22 to the second position shown in FIG. 13, with the plunger member 48 releasably mounted to a second opening 47A of wall 20, and with the pin members 52 of assembly 44 releasably mounted to second rear keyhole slots 54A of wall 20.

A user can thus advantageously move the assembly 44 from the first position shown in FIG. 12 to the second position shown in FIG. 13, and vice versa, without the use of tools, to thereby give the user multiple mounting options of assembly 44 to system 10.

Assembly 44 can be similarly moved to a third position (and back to the other positions), with the plunger member 48 releasably mounted to a third opening 47B of wall 20, and with the pin members 52 of assembly 44 releasably mounted to third rear keyhole slots 54B of wall 20.

Assembly 44 can be similarly moved to a fourth position (and back to the other positions), with the plunger member 48 releasably mounted to a fourth opening 47C of wall 20, and with the pin members 52 of assembly 44 releasably mounted to fourth rear keyhole slots 54C of wall 20.

It is noted that assembly 44A on left side 18 can be mounted and moved as described relative to assembly 44 of right side 20.

Figure 14:
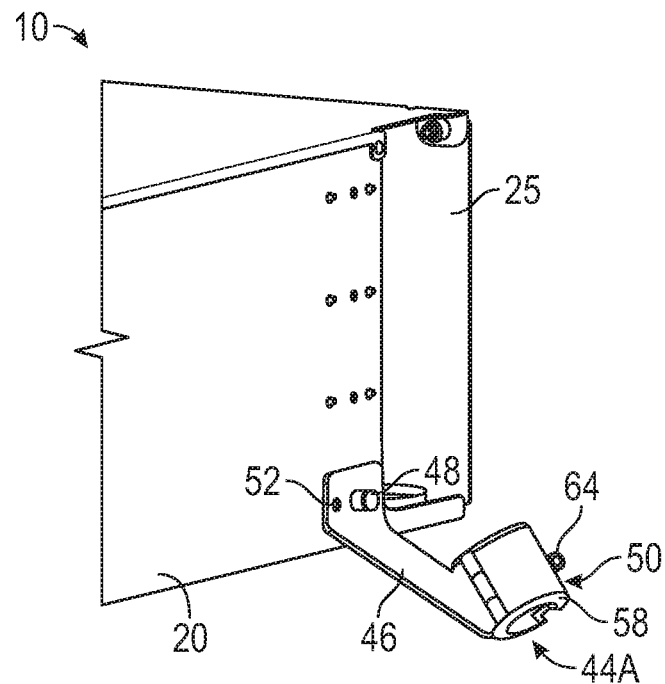

With reference to FIG. 14, it is noted that assembly 44A can be mounted to right side wall 20, with assembly 44A rotated 180° (FIG. 14) and with member 48 mounted to a respective opening 47, and with members 52 mounted to respective slots 54 of wall 20 (e.g., in the first, second, third or fourth positions).

Similarly, it is noted that assembly 44 can be mounted to left side wall 18, with assembly 44 rotated 180° and with member 48 mounted to a respective opening 47, and with members 52 mounted to respective slots 54 of wall 18 (e.g., in the first, second, third or fourth positions).

With the various mounting positions of rear cable management assemblies 44, 44A relative to walls 18, 20, this thereby allows for cable management functionality for cables/fibers 15 entering/exiting system 10 from various directions/locations (e.g., from the left, right, top, bottom and into or out of the rear of system 10).

As noted, each rear cable management assembly 44, 44A includes an extending portion 46 that extends to a retainer section 50.

In exemplary embodiments and as shown in FIGS. 12, 13, 16 and 18, rear cable management assembly 44 includes first grommet member 56 (e.g., cable retention grommet member 56) housed within retainer section 50.

Figure 18:
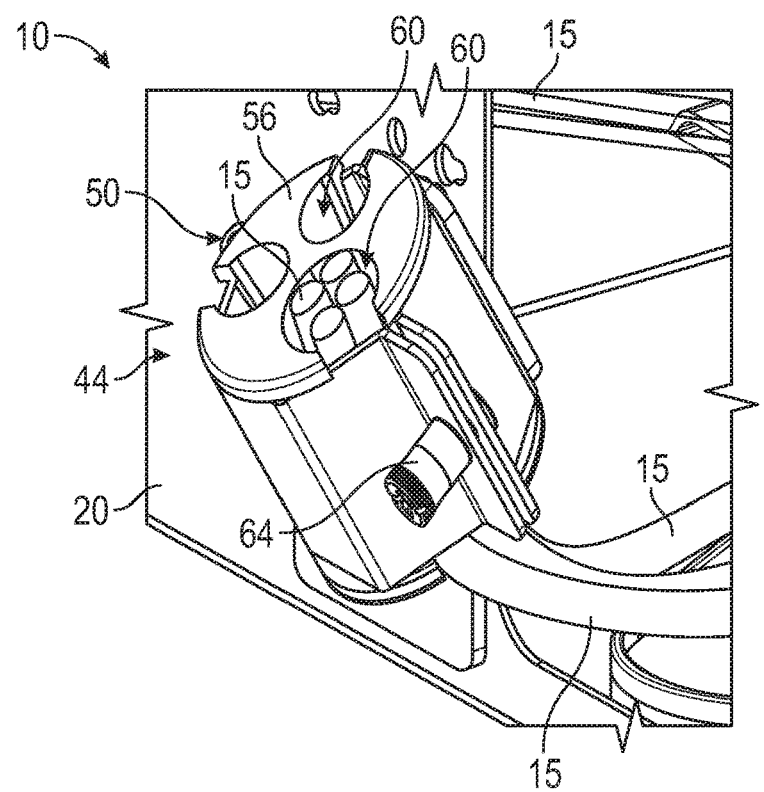

Exemplary first grommet member 56 includes three cable passages or lumens 60 configured to house, secure and/or contain cables/fibers 15 for cable management purposes (FIG. 18).

Retainer section 50 of rear cable management assembly 44 is configured to wrap around first grommet member 56 and engage rib members 62 of first grommet member 56 when securely and releasably fastened around first grommet member 56 via fastener member 64. This thereby secures and houses cables/fibers 15 in passages 60 for cable management purposes (FIG. 18).

It is noted that first grommet member 56 can include any suitable number and/or size of passages 60 for cable management purposes (e.g., one, two, three, four, etc.). In this way, first grommet member 56 provides retention passages 60 for multiple cables/fibers 15 and multiple cable/fiber 15 diameters/sizes.

Figure 17:
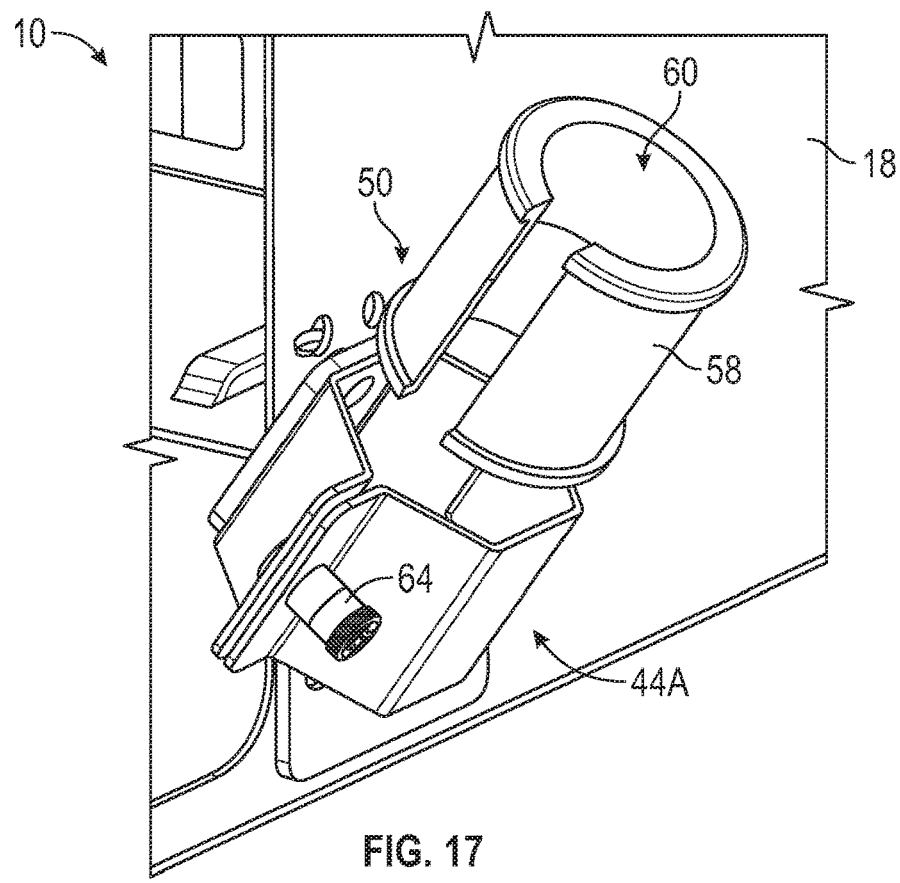

In exemplary embodiments and as shown in FIGS. 14 and 17, rear cable management assembly 44A includes second grommet member 58 (e.g., cable retention grommet member 58) housed within retainer section 50.

Exemplary second grommet member 58 includes cable passage or lumen 60 configured to house, secure and/or contain cables/fibers 15 for cable management purposes.

Retainer section 50 of rear cable management assembly 44A is configured to wrap around second grommet member 58 and engage the second grommet member 58 when securely and releasably fastened around second grommet member 58 via fastener member 64. This thereby secures and houses cables/fibers 15 in passage 60 for cable management purposes.

It is noted that second grommet member 58 can include any suitable number and/or size of passages 60 for cable management purposes (e.g., one, two, three, four, etc.). In this way, second grommet member 58 provides retention passage(s) 60 for multiple cables 15 and multiple cable 15 diameters/sizes.

It is also noted that rear cable management assembly 44A can include first grommet member 56 in lieu of second grommet member 58, and rear cable management assembly 44 can include second grommet member 58 in lieu of first grommet member 56.

With reference now to FIGS. 19-26, exemplary system 10 includes one or more pivotable cable management arms 68.

In certain embodiments, system 10 includes two pivotable cable management arms 68, one arm 68 positioned proximal left side wall 18 and proximal rear door 25, and another arm 68 proximal right side wall 20 and proximal rear door 25. It is noted that system 10 can include any suitable number of arms 68.

Figure 19:
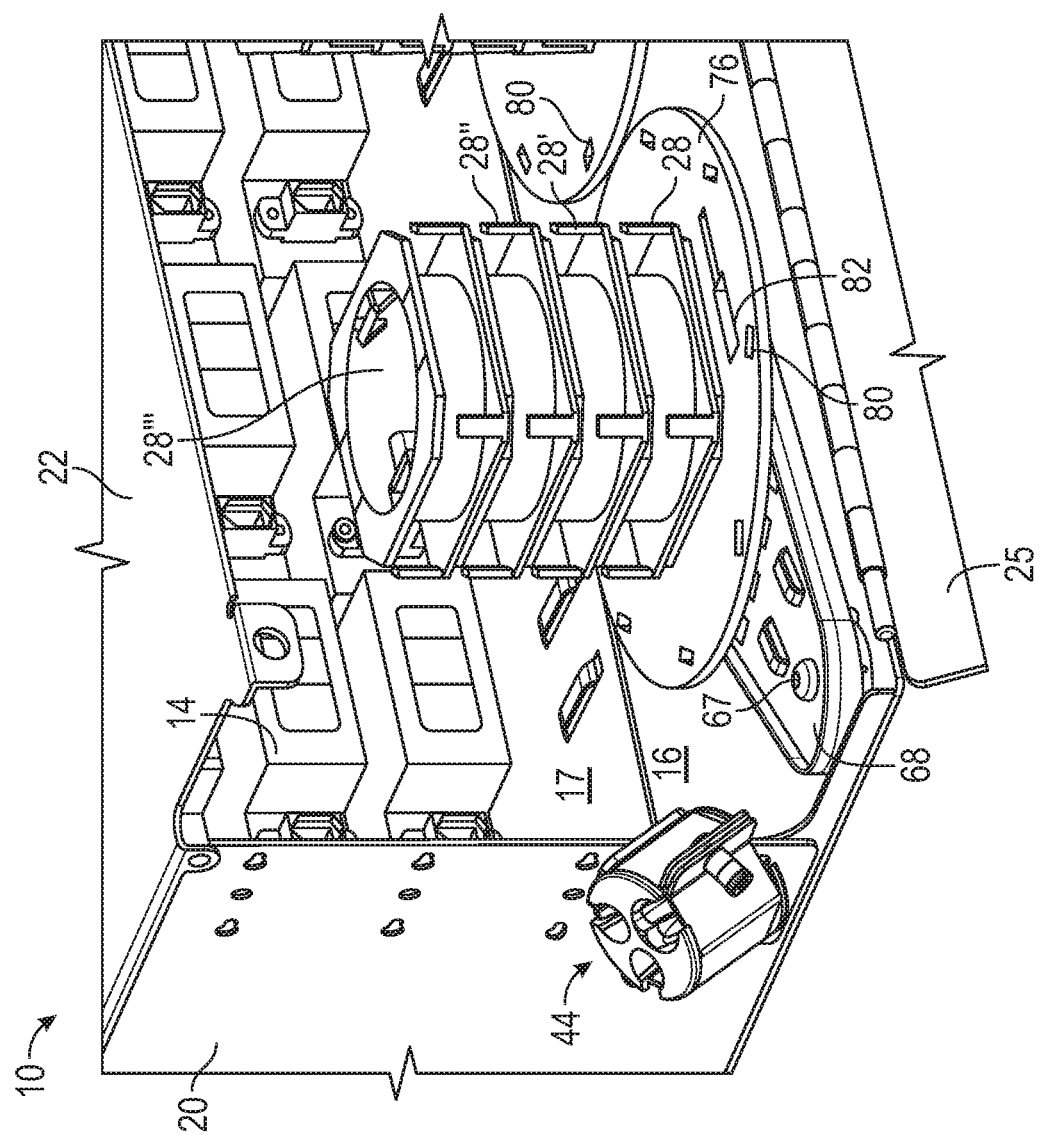
FIGS. 19-26 are partial rear side perspective views of the system of FIG. 1.
Figure 20:
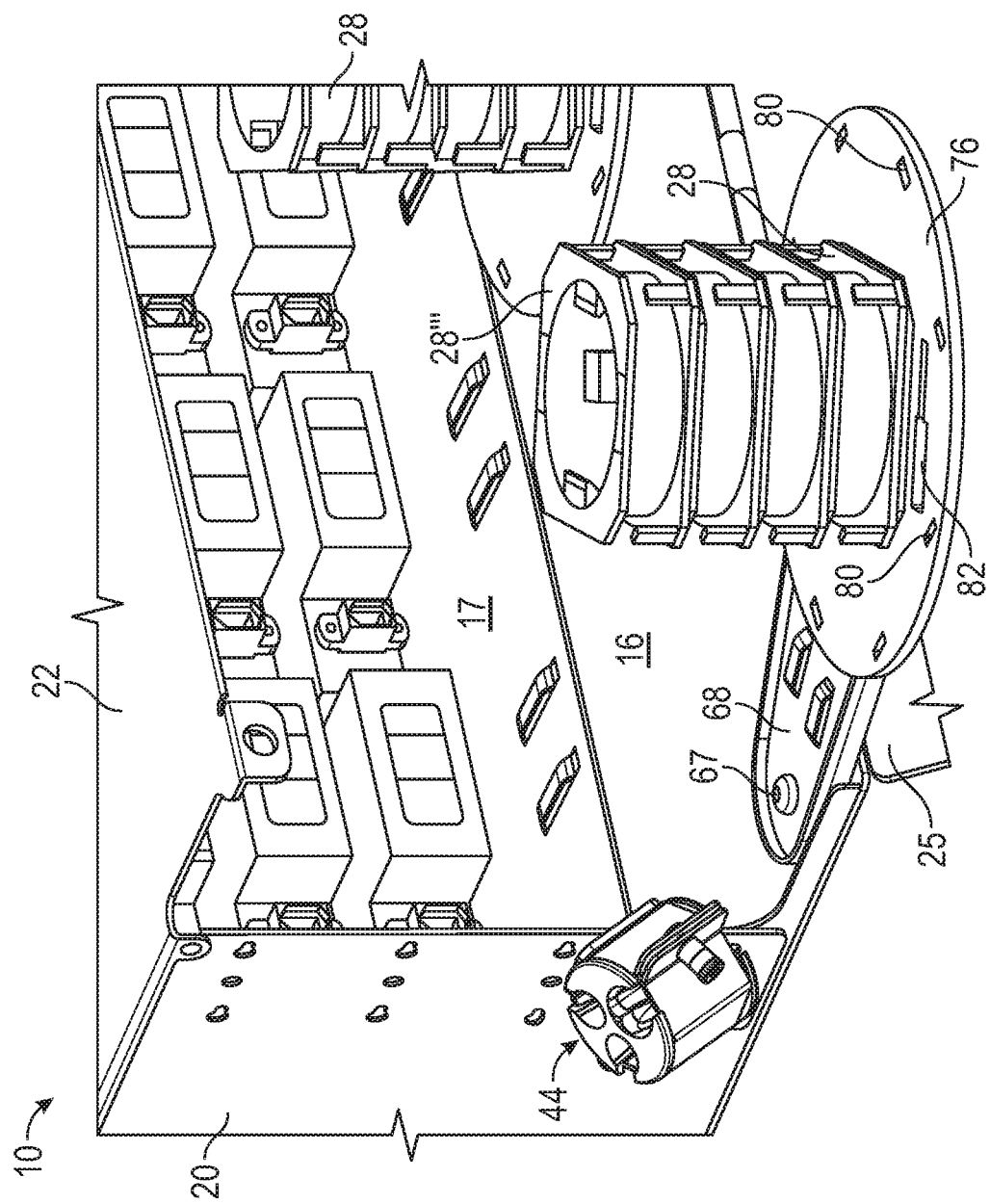

Each arm 68 is mounted to base member 16 and can pivot via pivot member 67 relative to base member 16. As such, each arm 68 can pivot and move away from the interior of system 10 and out rear side of system 10 when rear door 25 is open (FIG. 20), and can also then pivot and move toward interior of system 10 and onto base member 16 so that rear door 25 can be closed (FIG. 19).

Figure 21:
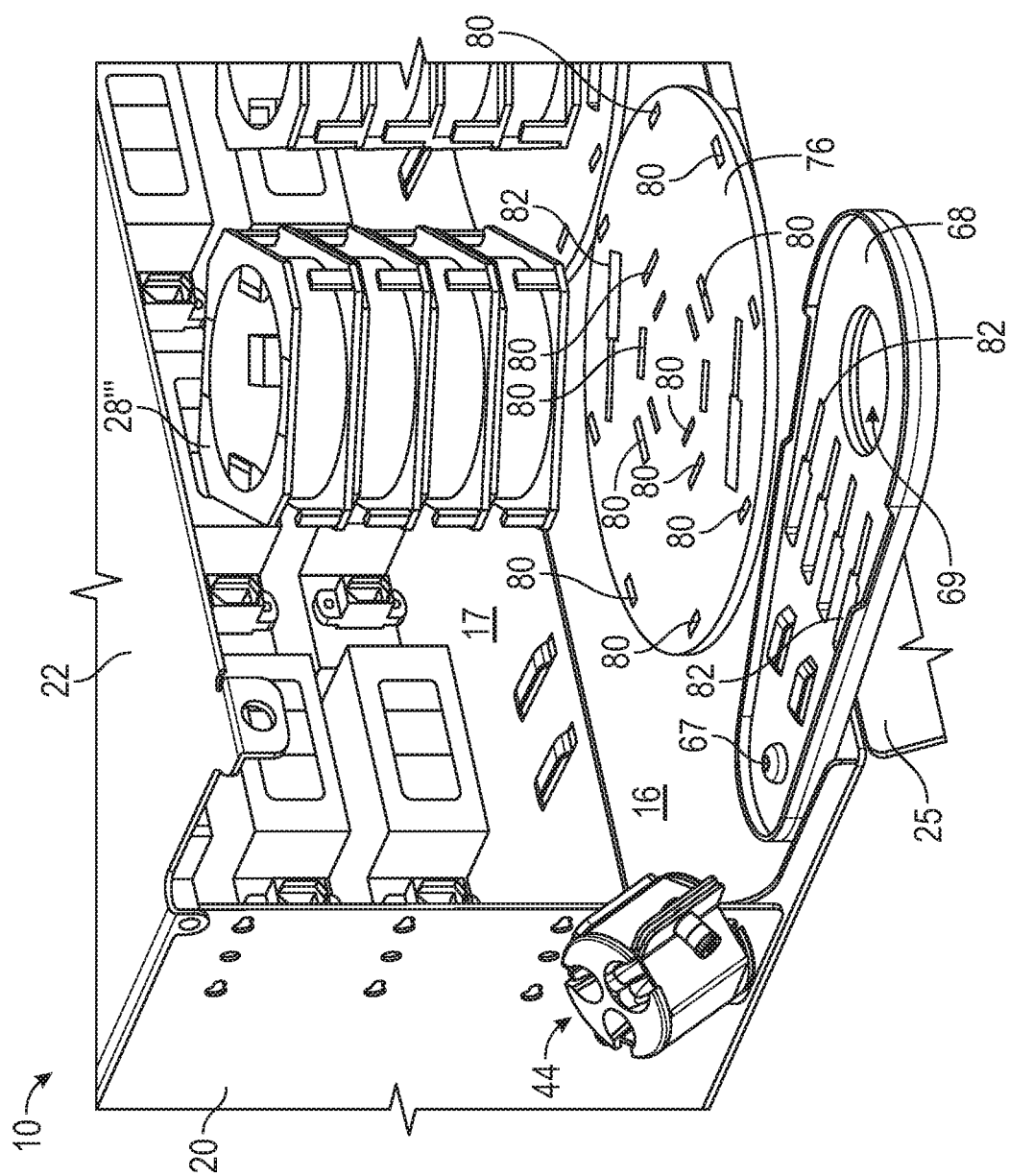
Figure 22:
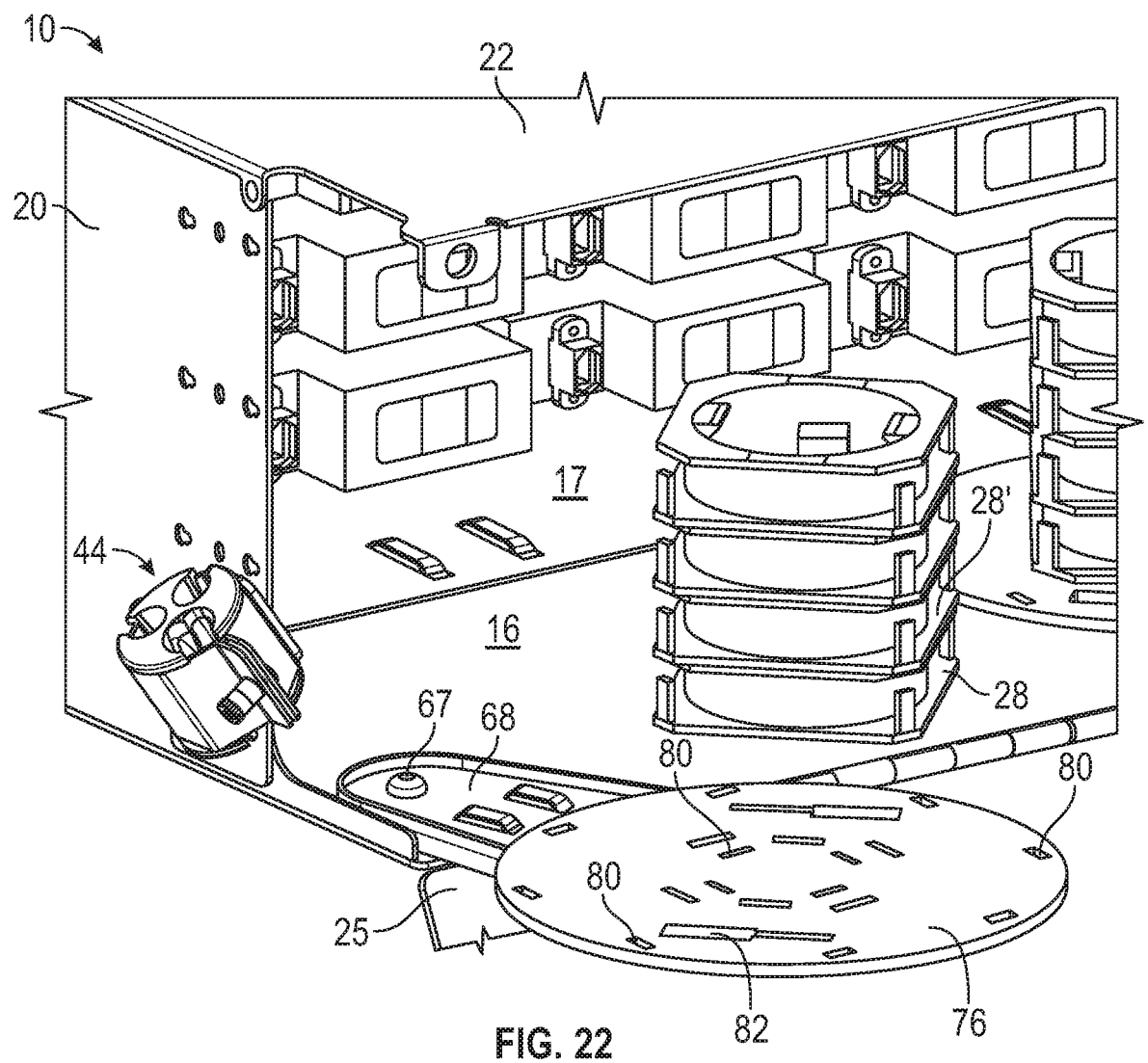

In exemplary embodiments and as shown in FIG. 21, arm 68 can rotate away from interior of system 10 until the arm 68 abuts against right side wall 20. Similarly, arm 68 near wall 18 can rotate away from interior of system 10 until the arm 68 abuts against left side wall 18.

Figure 24:
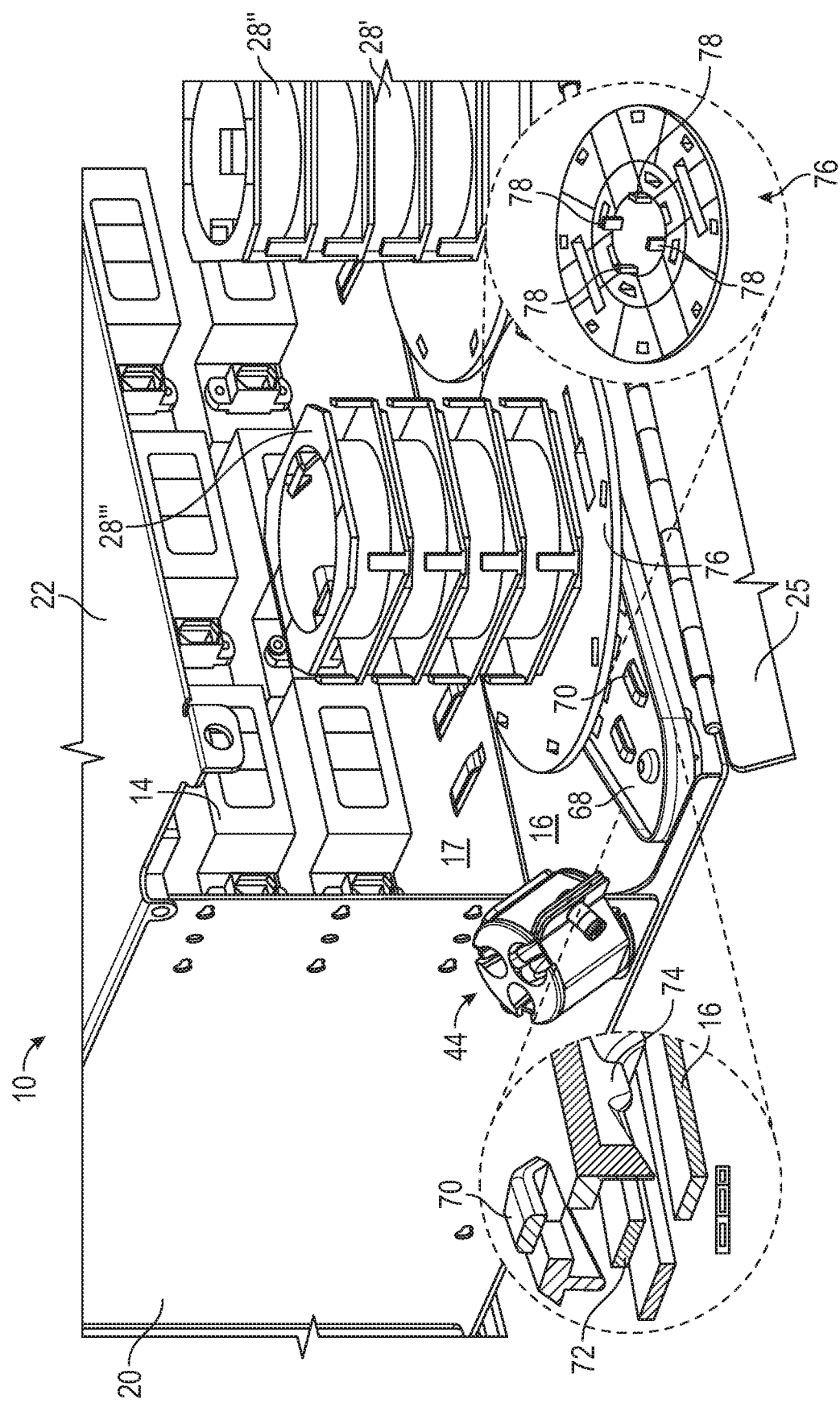

As shown in FIG. 24, arm 68 includes a bridge lance member 70 that is configured to abut against a bridge lance member 72 of base member 16 to stop the arm 68 from rotating too far into interior of system 10, and to stop the arm 68 at the position shown in FIG. 24. More particularly, when the arm 68 reaches the position shown in FIG. 24, a tab member 74 of the bridge lance member 70 abuts against the bridge lance member 72 of base member 16 to stop the arm 68 from rotating too far into interior of system 10.

A mounting disc 76 can be releasably mounted to each arm 68.

In general, mounting disc 76 is configured and dimensioned to allow one or more spool assemblies 28, 28A to be mounted thereon (e.g., for cable management purposes). In certain embodiments, mounting disc 76 is configured to removably mount with respect to an aperture 69 of arm 68.

As shown in FIG. 24, the bottom side of disc 76 includes one or more engagement members 78 that are configured to releasable engage and mount disc 76 relative to aperture 69 of arm 68. Once mounted relative to aperture 69 of arm 68, the disc 76 can freely rotate 360° around and relative to aperture 69 of arm. In short, the arm 68 can remain stationary and the disc 76 can rotate 360° relative to arm 68. As such, arm 68 with mounted disc 76 provides a mounting disc area 76 that is rotatable, and can include mounted spool assemblies 28 to manage slack cable/fiber 15 storage. For example, as an arm 68 rotates out, the disc 76 with spool assemblies 28 mounted thereon can rotate to pay out slack cable 15 inside the interior of system 10 to ensure substantially no stress is imparted into the cables 15. In exemplary embodiments, once spools 28 are mounted to disc 76, the spools 28 are stationary and do not rotate relative to disc 76. The disc 76 can rotate relative to arm 68.

As shown in FIG. 21, each exemplary mounting disc 76 can also include one or more slots 80 that are configured and dimensioned to allow spool assemblies 28, 28A to be mounted with respect to mounting disc 76 (e.g., for cable management purposes). Upper spool assemblies 28', 28" and 28''' can be mounted on top of the lower spool members 28.

In some embodiments and as described and disclosed in U.S. Pat. No. 8,731,364, the entire contents of which is hereby incorporated by reference in its entirety, each mounting disc 76 can include one or more apertures 82, each aperture 82 of disc 76 configured to releasably secure a breakout assembly 83 (FIGS. 25-26 show assembly 83 mounted directly to arm 68) or the like.

Figure 25:
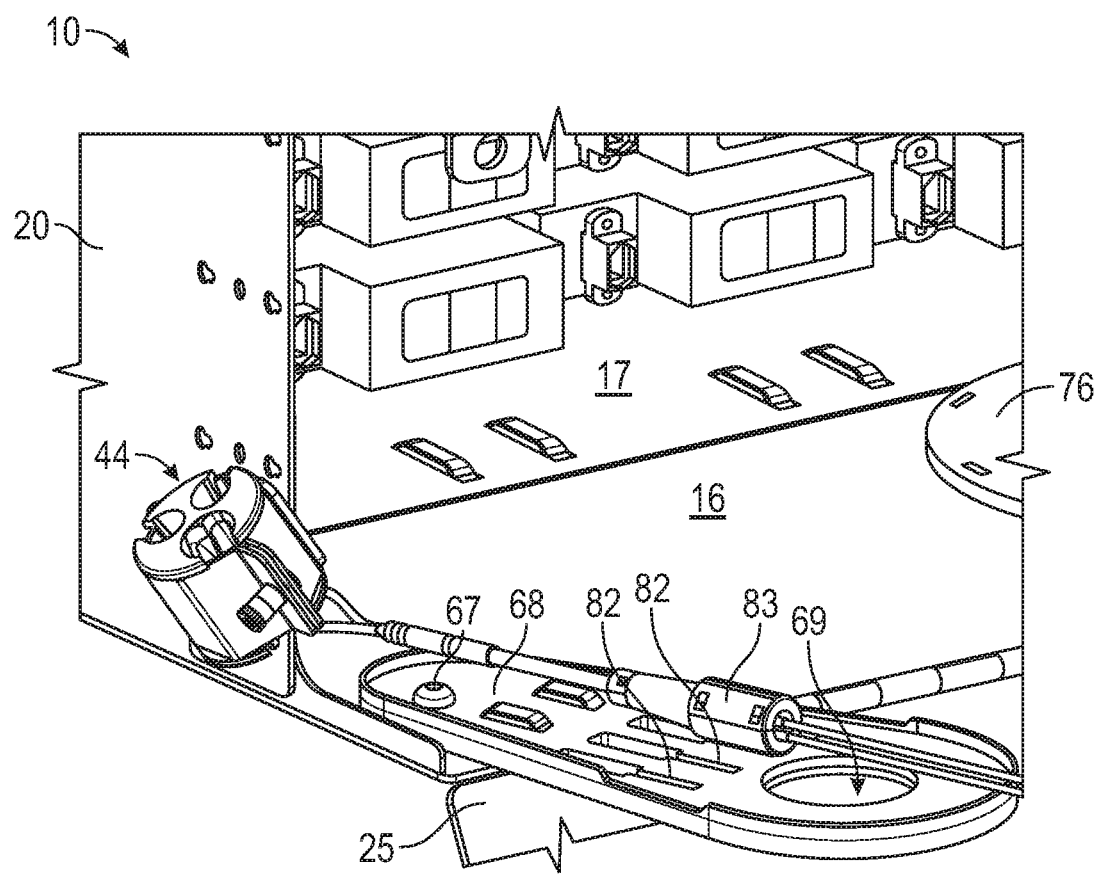
Figure 26:
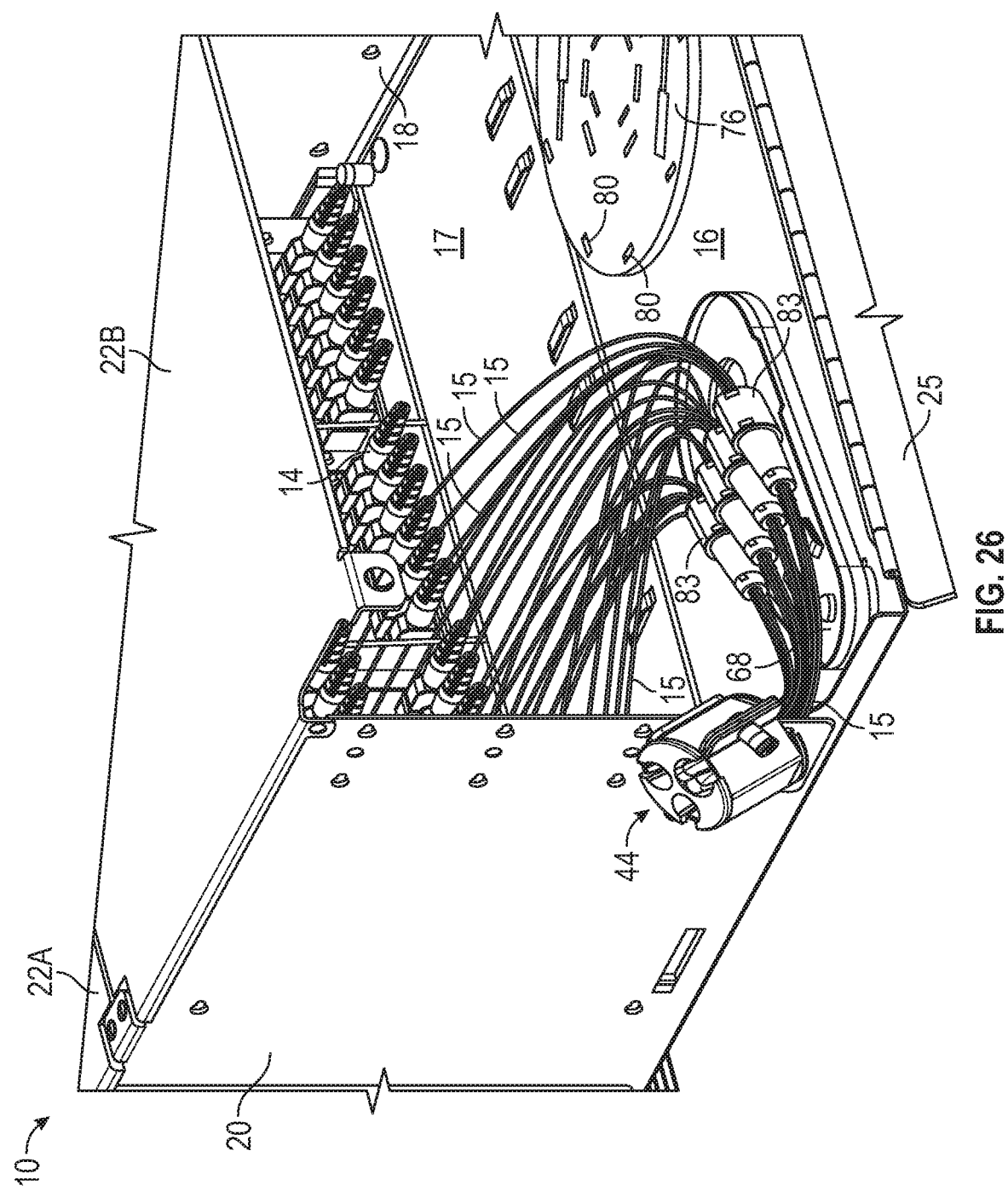

As shown in FIGS. 25-26, arm 68 may not include disc 76 thereon, and arm 68 can include one or more (e.g., four) apertures 82, each aperture 82 configured to releasably secure a breakout assembly 83 or the like.

Figure 23:
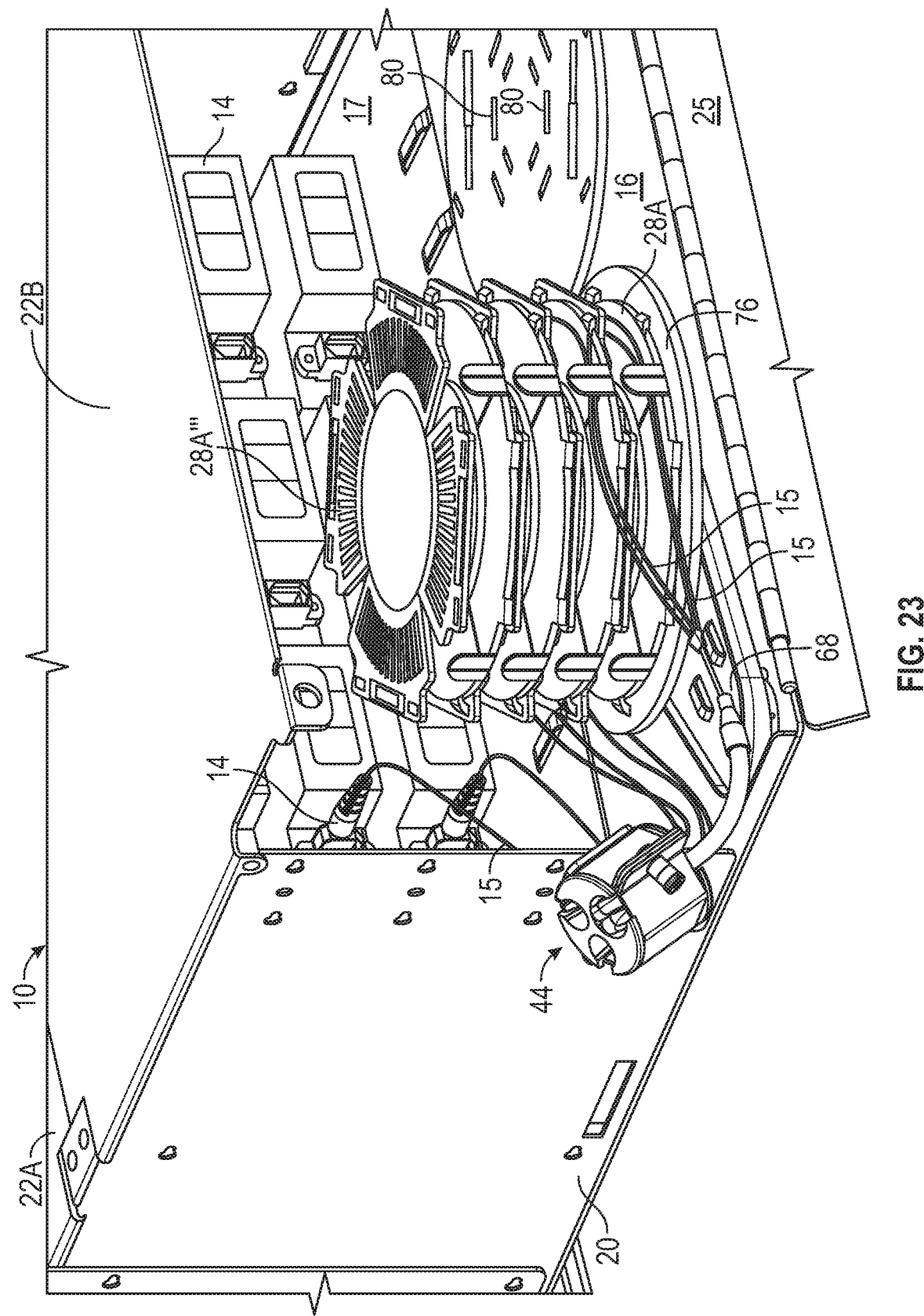

As shown in FIG. 23, spool assemblies 28 can be swapped out for spool assemblies 28A (e.g., larger assemblies 28A). Each spool assembly 28A can include a plurality of spool members (e.g., four spool members), as described and disclosed in U.S. Patent Pub. No. 2015/0362092, the entire contents of which is hereby incorporated by reference in its entirety.

FIG. 26 depicts cables/fibers 15 travelling from breakout assemblies 83 to rear cable management assembly 44 and to connector assemblies 14 (e.g., adapters 14) of system 10.

FIG. 23 depicts an exemplary rear cables/fibers 15 route from the rear cable management assembly 44 to spools 28A and then to connector assemblies 14 (e.g., cassettes 14) of system 10.

Figure 27:
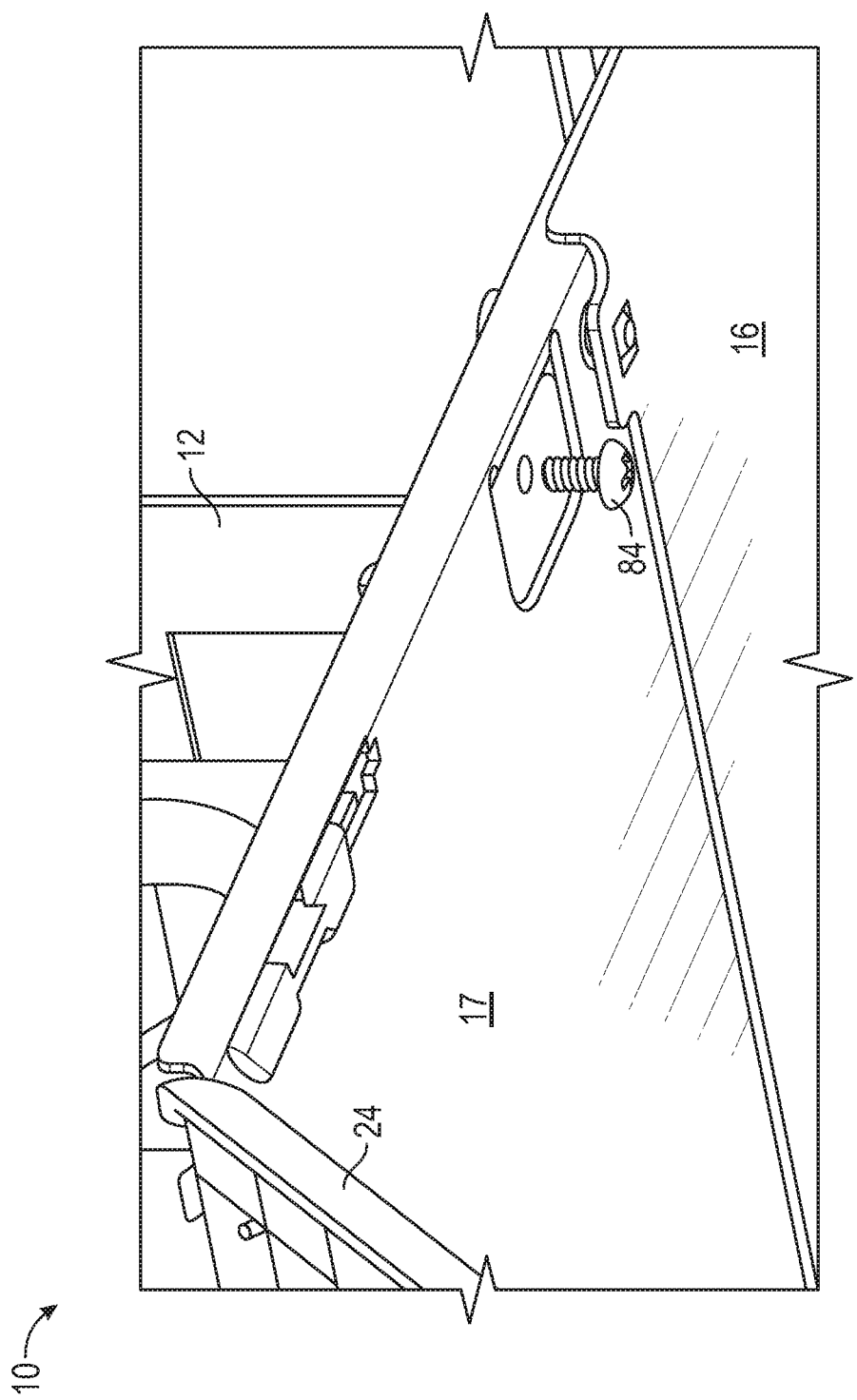
FIG. 27 is a partial bottom side perspective view of the system of FIG. 1.
Figure 28:
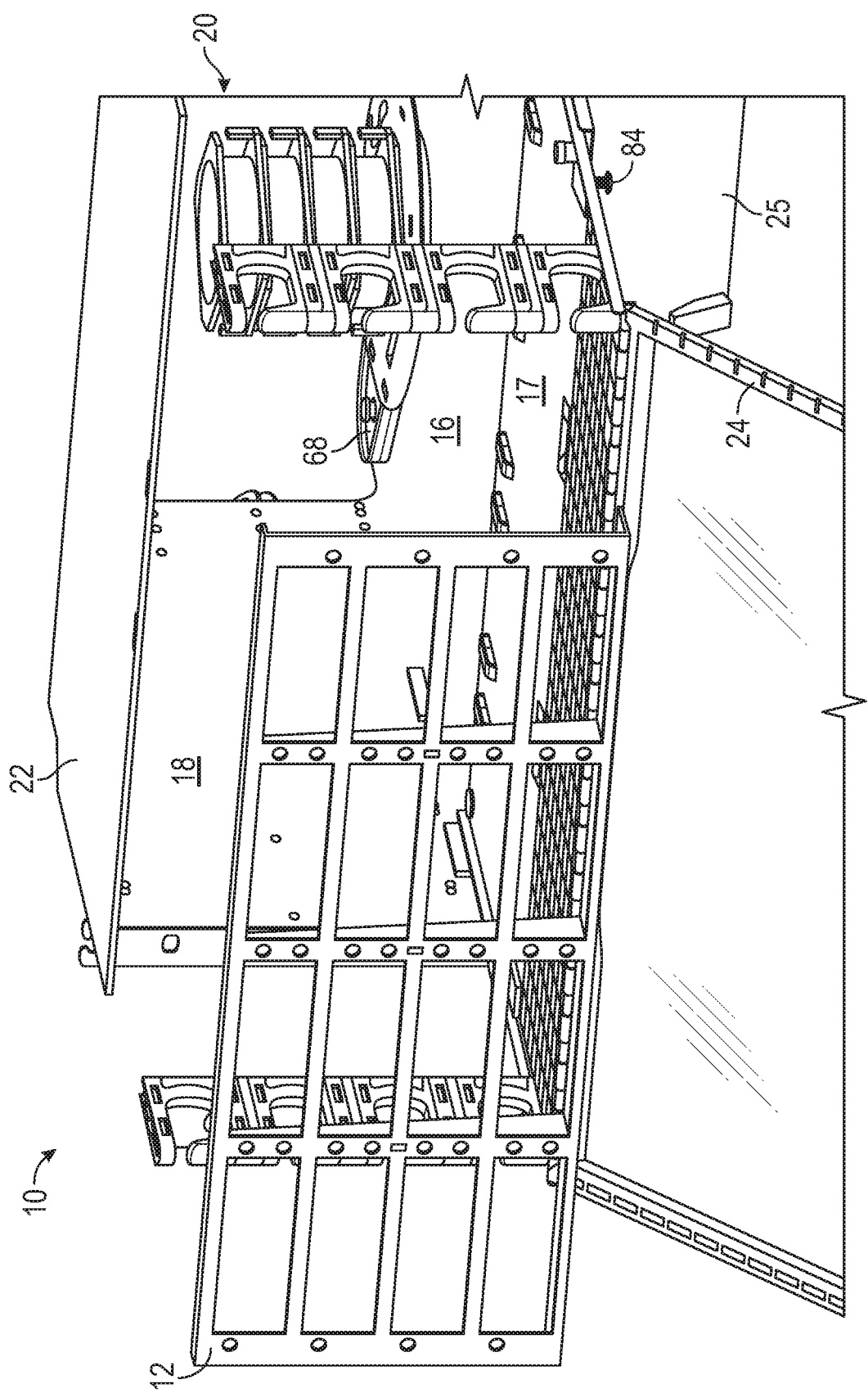
FIGS. 28-30 are partial side perspective views of the system of FIG. 1.
Figure 29:
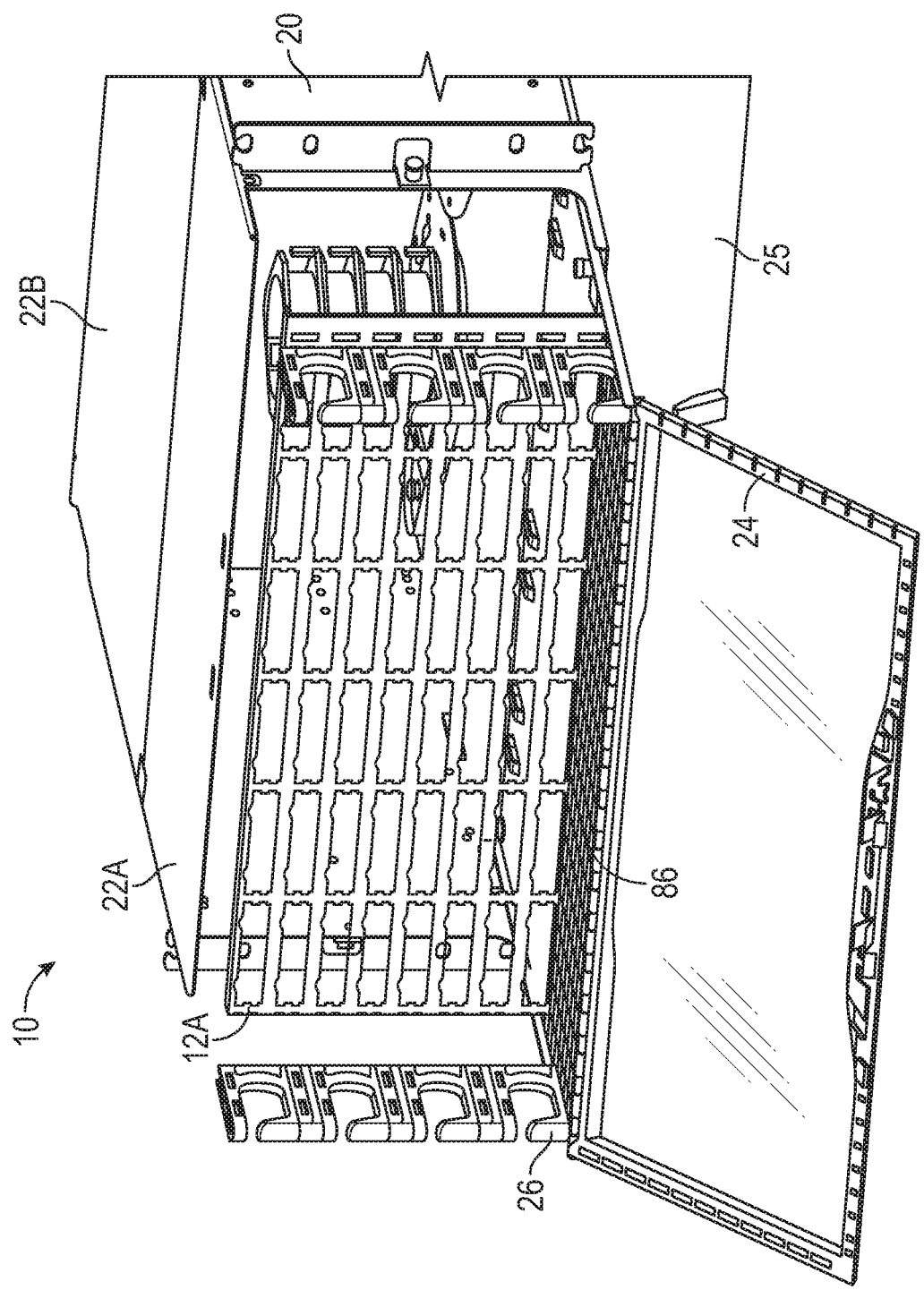

With reference to FIGS. 27-29, the tray member 17 includes one or more fastener members 84 (e.g., two members 84, one near left side 18 and one near right side 20) that are configured to mount panel assembly 12 to tray 17. As such, removal of fastener members 84 allow a user to quickly and easily remove and replace panel assembly for panel assembly 12A, or any other type of desired and suitable panel assembly 12, 12A, 12', 12" or the like. Therefore, a user can easily remove panel assembly 12 to swap out assembly 12 to for another assembly 12A, 12', 12" or the like in order for system 10 to support other connector assemblies 14 (e.g., other or different types/heights of cassettes/adapters 14 or the like).

Figure 30:
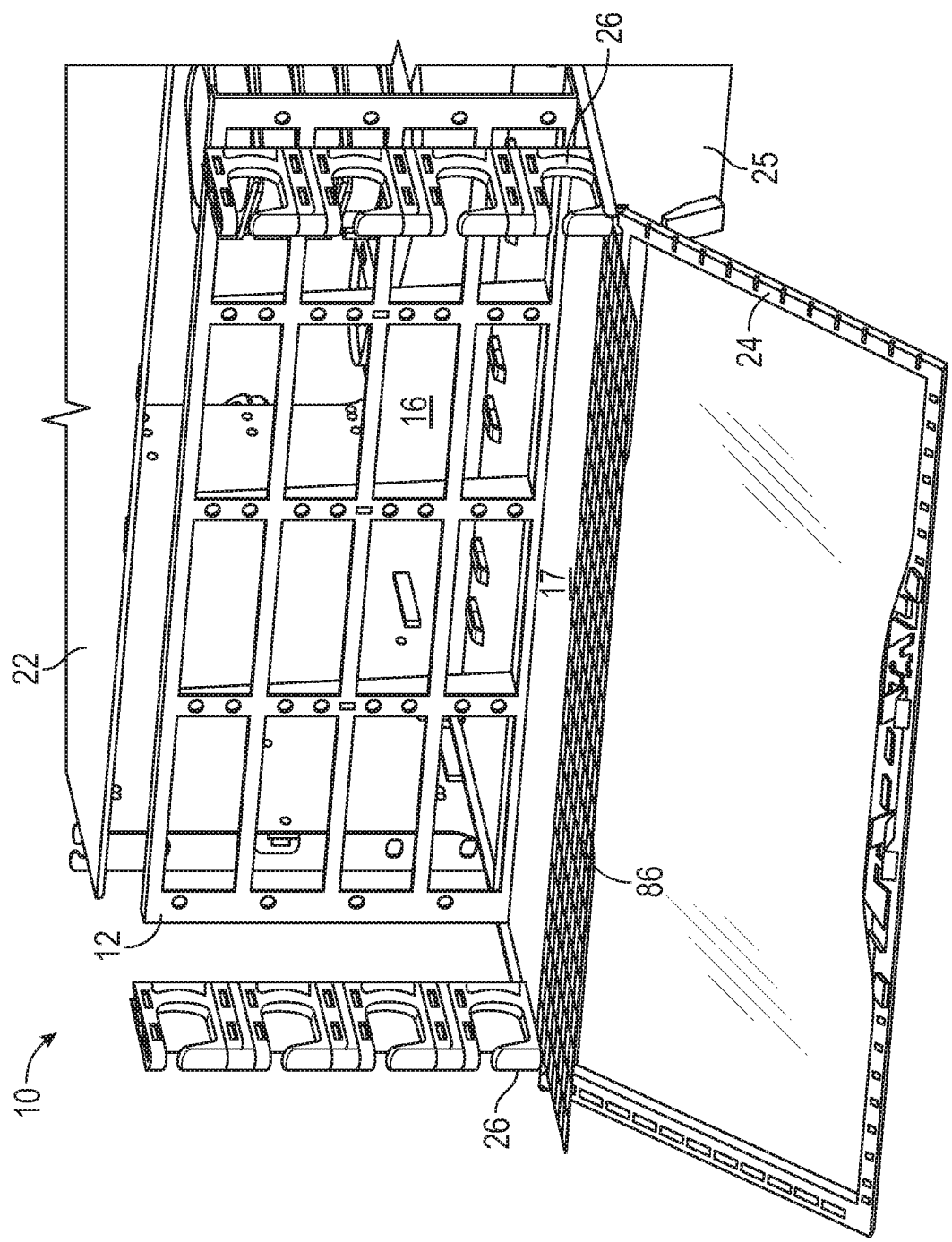

As shown in FIG. 30, a sliding or moveable label field member 86 (e.g., plastic member with label card 86) can be positioned on top of tray member 17, and member 86 can also be removed and replaced from tray 17 with another sliding/moveable label field member 86 or the like. In general, each moveable label field member 86 includes information for ease of viewing/use by the user (e.g., information regarding connector assemblies 14 or cassettes/adapters 14 or the like; information regarding what each port connects to, etc.).

In exemplary embodiments, each cable manager member 26 mounted to tray 17 (e.g., one near left side 18 and one near right side 20) includes a slot that the moveable label field member 86 can be slid/moved within when mounting or removing the member 86. Once mounted, exemplary member 86 abuts against panel 12.

Figure 31:
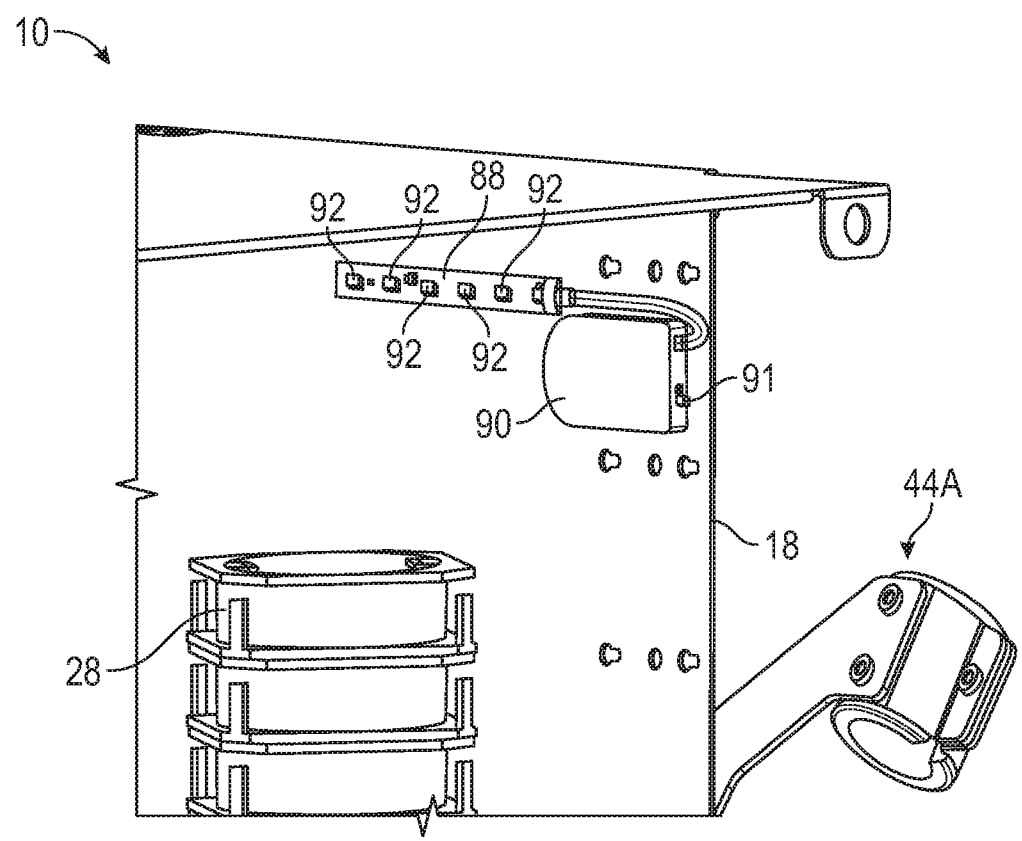
FIG. 31 is a partial rear side perspective views of the system of FIG. 1.

With reference to FIG. 31, the interior of left side wall 18 and/or the interior of right side wall 20 can include one or more LED lighting members 88 (e.g., the LED lighting members 88 are provided on both interior sides 18, 20 of the system near the top rear door 25 when closed).

Each LED lighting member 88 can be mounted to a battery 90, and the LED lighting member 88 and the battery 90 can be mounted to interior of wall 18 and/or 20. Exemplary battery 90 also includes an on/off switch 91 for LED lighting member 88.

Exemplary LED lighting member 88 includes a strip or length of LED lights 92 for lighting purposes of interior of system 10.

In certain embodiments, the battery 90 powered LED lighting 88 in the rear of the system 10 takes the form of a set of lighting strips 88 on both interior sides 18, 20 of the system 10 rear, near the top cover 22, aligned in a fore/aft direction. The on/off switches 91 are positioned at the rear of the interior of the system 10, and just inside of the rear cable management assemblies 44, 44A.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A media patching system, comprising:
   a tray member movably mounted relative to a base member, the tray member hingedly mounted to a front door member;
   a left side wall, a right side wall and a rear door member mounted to the base member, with a top cover member mounted to the left and right side walls;
   a first panel assembly mounted to the tray member, the first panel assembly having a plurality of apertures with each aperture configured to mount to a media connector assembly;
   a first C-shaped cable manager member mounted to the tray member proximal to the left side wall; and
   a second C-shaped cable manager member mounted to the tray member proximal to the right side wall,
   wherein at least one of (i) the first C-shaped cable manager member is configured to receive a third C-shaped cable manager member or a first spacer member at a top of the first C-shaped cable manager member, or (ii) the second C-shaped cable manager member is configured to receive a fourth C-shaped cable manager member or a second spacer member at a top of the second C-shaped cable manager member.

2. The system of claim 1, wherein the tray member can move relative to the base member; and
   wherein the media connector assembly includes one or more ports or adapters to facilitate communication with a mating fiber optic connector.

3. The system of claim 1, wherein the media connector assembly is a fiber optic cassette having a plurality of fiber optic ports for mating with fiber optic connectors.

4. The system of claim 1, wherein when the front door member opens, a cam surface of the base member cams against the front door member, thereby moving the tray member forward; and
   wherein the base member includes one or more tab members that provide the camming surface and camming action against the front door member to move the tray member forward.

5. The system of claim 1, further comprising a third C-shaped cable manager member mounted to a top of the first C-shaped cable manager member; and
   a fourth C-shaped cable manager member mounted to a top of the second C-shaped cable manager member.

6. The system of claim 5, wherein the third C-shaped cable manager member is mounted to the top of the first C-shaped cable manager member via a first spacer member; and
   wherein the fourth C-shaped cable manager member is mounted to the top of the second C-shaped cable manager member via a second spacer member.

7. The system of claim 1, wherein the first C-shaped cable manager member is mounted to the tray member proximal to the left side wall via a first protrusion member; and
   wherein the second C-shaped cable manager member is mounted to the tray member proximal to the right side wall via a second protrusion member; and
   wherein the first and second C-shaped cable manager members are each configured to house or secure cables or fibers for cable or fiber management purposes.

8. The system of claim 1, wherein the tray member includes one or more fastener members that are configured to mount the first panel assembly to the tray member;
   wherein removal of the one or more fastener members allow a user to quickly and easily remove and replace the first panel assembly for a second panel assembly mounted to tray member via the one or more fastener members, the second panel assembly having a plurality of apertures with each aperture configured to mount to a media connector assembly.

9. The system of claim 1, wherein a first moveable label field member can be positioned on top of the tray member, and the first moveable label field member can also be removed and replaced from the tray member with a second moveable label field member.

10. The system of claim 1, wherein the interior of the left and right side walls each include one or more LED lighting members, each LED lighting member mounted to a battery; and wherein each LED lighting member includes a strip or length of LED lights.

11. The system of claim 1, wherein the tray member is slidable relative to the base member.

12. The system of claim 11, wherein the first and second C-shaped cable manager members slide relative to the base member with the tray member.

13. The system of claim 1, wherein the first and second C-shaped cable manager members are mounted to a bottom surface of the tray member.

14. The system of claim 1, wherein at least one of (i) the C-shaped cable manager member or the first spacer member is vertically mountable to the top of the first C-shaped cable manager member, or (ii) the fourth C-shaped cable manager member or the second spacer member is vertically mountable to the top of the second C-shaped cable manager member.

15. A media patching system, comprising:
a tray member movably mounted relative to a base member, the tray member hingedly mounted to a front door member;
a first panel assembly mounted to the tray member, the first panel assembly having a plurality of apertures;
a first cable manager member mounted to the tray member; and
a second cable manager member mounted to the tray member,
wherein at least one of (i) the first cable manager member is configured to receive a third cable manager member or a first spacer member at a top of the first cable manager member, or (ii) the second cable manager member is configured to receive a fourth cable manager member or a second spacer member at a top of the second cable manager member.

16. The system of claim 15, wherein when the front door member opens, a cam surface of the base member cams against the front door member, thereby moving the tray member forward.

17. The system of claim 16, wherein the base member includes one or more tab members that provide the camming surface and camming action against the front door member to move the tray member forward.

18. The system of claim 15, comprising a third cable manager member mounted to a top of the first C-shaped cable manager member, and a fourth cable manager member mounted to a top of the second cable manager member.

19. The system of claim 18, wherein the third cable manager member is mounted to the top of the first cable manager member via a first spacer member, and the fourth cable manager member is mounted to the top of the second cable manager member via a second spacer member.

20. The system of claim 15, wherein the tray member is slidable relative to the base member.

21. The system of claim 20, wherein the first and second cable manager members slide relative to the base member with the tray member.

22. The system of claim 15, wherein the first and second cable manager members are mounted to a bottom surface of the tray member.

23. The system of claim 15, wherein at least one of (i) the cable manager member or the first spacer member is vertically mountable to the top of the first cable manager member, or (ii) the fourth cable manager member or the second spacer member is vertically mountable to the top of the second cable manager member.

24. A media patching system, comprising:
a tray member movably mounted relative to a base member, the tray member hingedly mounted to a front door member;
a first panel assembly mounted to the tray member, the first panel assembly having a plurality of apertures;
a first cable manager member mounted to the tray member, wherein the first cable manager member is configured to receive a second cable manager member or a spacer member at a top of the first cable manager member, and the first and second cable manager members define the same configuration and structure.

25. The system of claim 24, wherein the first and second cable manager members each define a C-shaped configuration.

* * * * *